(12) United States Patent
Yim

(10) Patent No.: US 12,062,163 B2
(45) Date of Patent: Aug. 13, 2024

(54) HIGH DYNAMIC RANGE POST-PROCESSING DEVICE, AND DISPLAY DEVICE INCLUDING THE SAME

(71) Applicant: SAMSUNG DISPLAY CO., LTD., Yongin-si (KR)

(72) Inventor: Dale Yim, Yongin-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 609 days.

(21) Appl. No.: 17/335,418

(22) Filed: Jun. 1, 2021

(65) Prior Publication Data
US 2022/0122234 A1  Apr. 21, 2022

(30) Foreign Application Priority Data

Oct. 21, 2020  (KR) .................. 10-2020-0136983

(51) Int. Cl.
*G06T 5/90* (2024.01)
*G09G 5/00* (2006.01)
*G09G 5/02* (2006.01)

(52) U.S. Cl.
CPC .............. *G06T 5/90* (2024.01); *G09G 5/006* (2013.01); *G09G 5/02* (2013.01); *G06T 2207/20208* (2013.01); *G09G 2320/0242* (2013.01)

(58) Field of Classification Search
CPC . G06T 5/90; G06T 2207/20208; G09G 5/006; G09G 5/02; G09G 2320/0242; G09G 2360/16; G09G 5/10; G09G 3/3208; G09G 3/3611; G09G 2320/0233; G09G 2340/0435; H04N 19/117; H04N 19/137; H04N 19/172; H04N 19/86
See application file for complete search history.

(56) References Cited

U.S. PATENT DOCUMENTS

| | | | |
|---|---|---|---|
| 11,128,878 B2* | 9/2021 | Ramasubramonian | ...................... H04N 19/80 |
| 11,277,646 B2* | 3/2022 | Song | ...................... H04N 19/86 |
| 2018/0020224 A1* | 1/2018 | Su | ...................... H04N 19/192 |
| 2021/0368212 A1* | 11/2021 | Song | ...................... H04N 19/117 |
| 2022/0058783 A1* | 2/2022 | Kadu | ...................... H04N 19/132 |

FOREIGN PATENT DOCUMENTS

KR  10-2019-0073633  6/2019

* cited by examiner

*Primary Examiner* — Molly Wilburn
(74) *Attorney, Agent, or Firm* — F. CHAU & ASSOCIATES, LLC

(57) ABSTRACT

A high dynamic range (HDR) post-processing device of a display device includes a HDR post-processing analysis block configured to determine a post-processing function by analyzing input image data, and a HDR post-processing processor configured to receive a backward select signal, and to selectively perform a HDR forward process corresponding to the post-processing function or a HDR backward process corresponding to an inverted function of the post-processing function on the input image data in response to the backward select signal.

20 Claims, 18 Drawing Sheets

FIG. 4B $$\text{IN\_LOW} = \text{Y\_MID}/2 \quad \text{—352}$$

$$\text{IN\_MID} = \text{Y\_MID} \quad \text{—354}$$

$$\text{IN\_HIGH} = \text{Y\_MID} + (\text{Y\_MAX} - \text{Y\_MID})/2 \quad \text{—356}$$

$$\text{OUT\_LOW} = \text{IN\_LOW} - |(\text{Y\_LOW} - \text{IN\_LOW})| \quad \text{—362}$$

$$\text{OUT\_MID} = \text{IN\_MID} \quad \text{—364}$$

$$\text{OUT\_HIGH} = \text{IN\_HIGH} + |(\text{Y\_HIGH} - \text{IN\_HIGH})| \quad \text{—366}$$

FIG. 5A $$DIFF\_LOW = IN\_LOW - OUT\_LOW \quad \text{—372}$$

$$OUT\_LOW' = IN\_LOW - (DIFF\_LOW * GAIN) \quad \text{—374}$$

$$DIFF\_HIGH = OUT\_HIGH - IN\_HIGH \quad \text{—382}$$

$$OUT\_HIGH' = IN\_HIGH + (DIFF\_HIGH * GAIN) \quad \text{—384}$$

FIG. 6

IF (Y_IN < IN_MID)
CONV_DIFF = 2*(OUT_LOW-IN_LOW)*Y_IN/IN_LOW - (OUT_LOW-IN_LOW)*(Y_IN)^2/(IN_LOW)^2    ~410

IF (Y_IN > IN_MID)
CONV_DIFF = 2*(OUT_HIGH-IN_HIGH)*(Y_IN-IN_MID)/(IN_HIGH-IN_MID) - (OUT_HIGH-IN_HIGH)*(Y_IN-IN_MID)^2/(IN_HIGH-IN_MID)^2    ~430

IF (BACKWARD_SEL = 0)
Y_OUT = Y_IN + CONV_DIFF    ~450

IF (BACKWARD_SEL = 1)
Y_OUT = Y_IN - CONV_DIFF    ~470

LOW FRAME RATE (30 Hz) / IMAGE WITH GREAT MOVEMENT

HIGH FRAME RATE (120 Hz) / IMAGE WITH SMALL MOVEMENT

HIGH DYNAMIC RANGE POST-PROCESSING DEVICE, AND DISPLAY DEVICE INCLUDING THE SAME

CROSS-REFERENCE TO RELATED APPLICATION(S)

This application claims priority under 35 USC § 119 to Korean Patent Applications No. 10-2020-0136983, filed on Oct. 21, 2020, in the Korean Intellectual Property Office (KIPO), the disclosure of which is incorporated by reference herein in its entirety.

BACKGROUND

1. Technical Field

One or more embodiments herein relate to high dynamic range post-processing devices and a display device including a post-processing device.

2. Description of the Related Art

Various processing techniques have been developed to display high dynamic range (HDR) images. These techniques may be used to decrease luminance of a low grayscale image or low luminance image and to increase luminance of a high grayscale image or high luminance image. The intended result is to improve image quality. However, unlike in a standard dynamic range (SDR) image, a judder phenomenon may occur when generating HDR images. This phenomenon may cause image objects to move unnaturally or in a discontinuous manner.

SUMMARY

One or more embodiments described herein provide a high dynamic range (HDR) post-processing device that may prevent or reduce a judder phenomenon, and one or more additional embodiments provide a display device that includes such an HDR post-processing device.

In accordance with one or more embodiments, a system includes first logic configured to analyze image data to determine a post-processing function; and a processor configured to receive a backward select signal and to selectively perform a high dynamic range (HDR) forward process or an HDR backward process on the image data in response to the backward select signal, wherein the HDR forward process corresponds to the post-processing function and wherein the HDR backward process corresponds to an inverted function of the post-processing function.

In accordance with one or more embodiments, a system includes first logic configured to analyze image data to determine a first post-processing function corresponding to a high dynamic range (HDR) forward process; second logic configured to receive a backward select signal and select the first post-processing function or a second post-processing function corresponding to a HDR backward process in response to the backward select signal; an a processor configured to perform: the HDR forward process corresponding to the first post-processing function on the image data when the first post-processing function is selected, and the HDR backward process corresponding to the second post-processing function on the image data when the second post-processing function is selected.

In accordance with one or more embodiments, a display device includes a display panel including a plurality of pixels; a data driver configured to provide data signals to the plurality of pixels; a scan driver configured to provide scan signals to the plurality of pixels; and a controller configured to control the data driver and the scan driver, the controller comprising: logic configured to receive a backward select signal, analyze image data to determine a post-processing function, and selectively perform a high dynamic range (HDR) forward process or an HDR backward process on the image data in response to the backward select signal, where the HDR forward process correspond to the post-processing function and wherein the HDR backward process corresponds to an inverted function of the post-processing function.

In accordance with one or more embodiments, a non-transitory computer-readable medium storing instructions, which, when executed by one or more processors, causes the one or more processors to: analyze image data to determine a post-processing function; and selectively perform a high dynamic range (HDR) forward process or an HDR backward process on the image data in response to a backward select signal, wherein the HDR forward process corresponds to the post-processing function and wherein the HDR backward process corresponds to an inverted function of the post-processing function.

BRIEF DESCRIPTION OF THE DRAWINGS

Illustrative, non-limiting embodiments will be more clearly understood from the following detailed description taken in conjunction with the accompanying drawings.

FIGS. 4A and 4B illustrate examples of performing HDR post-processing analysis.

FIGS. 5A and 5B illustrate examples of performing HDR post-processing analysis.

FIG. 6 illustrates example operations of a HDR post-processing processor.

DESCRIPTION OF EMBODIMENTS

Figure 1:
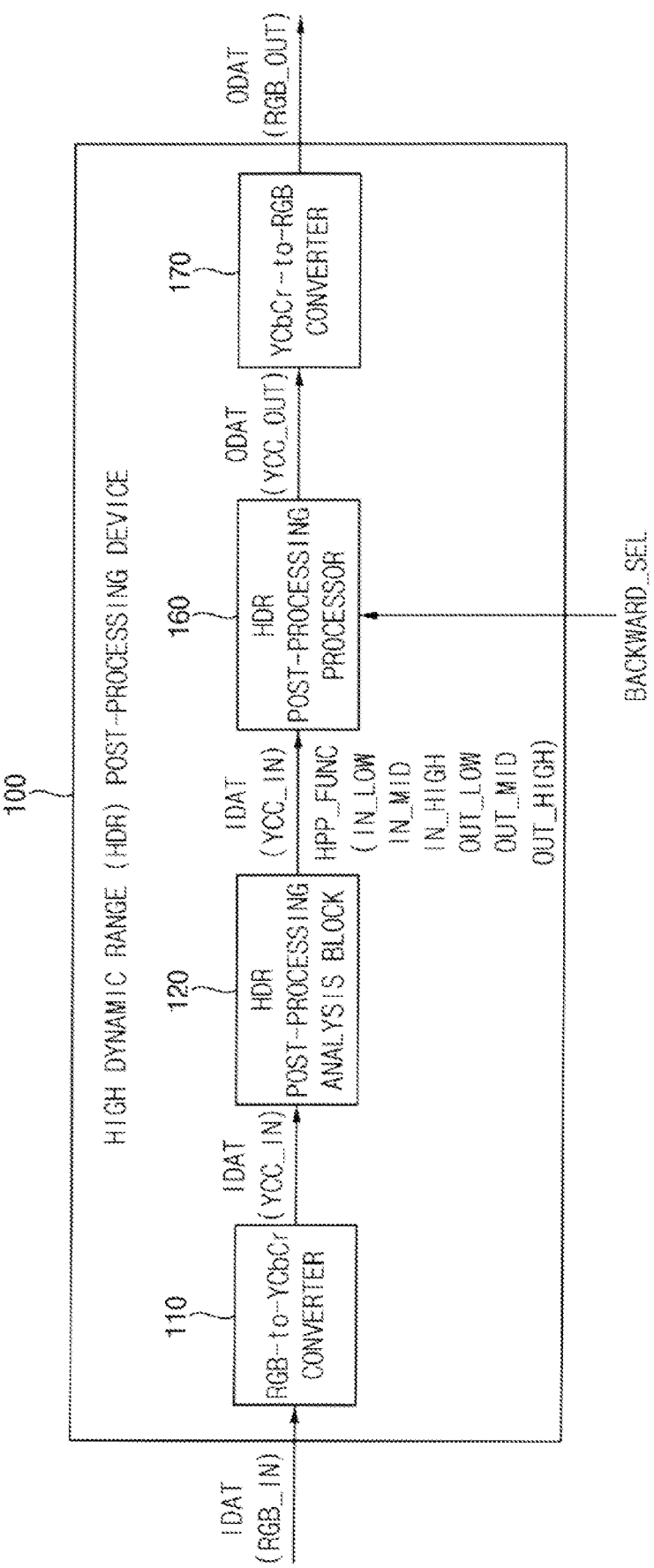
FIG. 1 illustrates an embodiment of an HDR post-processing device.
Figure 2:
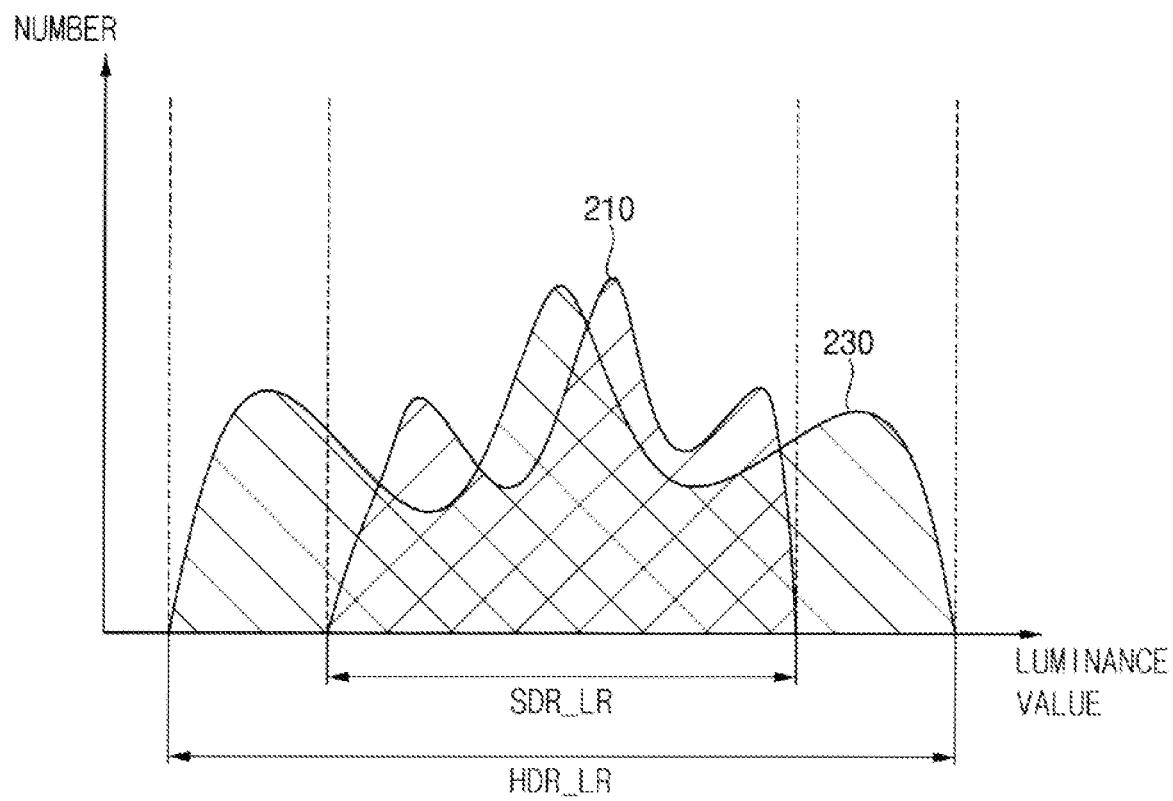
FIG. 2 illustrates examples of luminance ranges of an SDR image and an HDR image.
Figure 3:
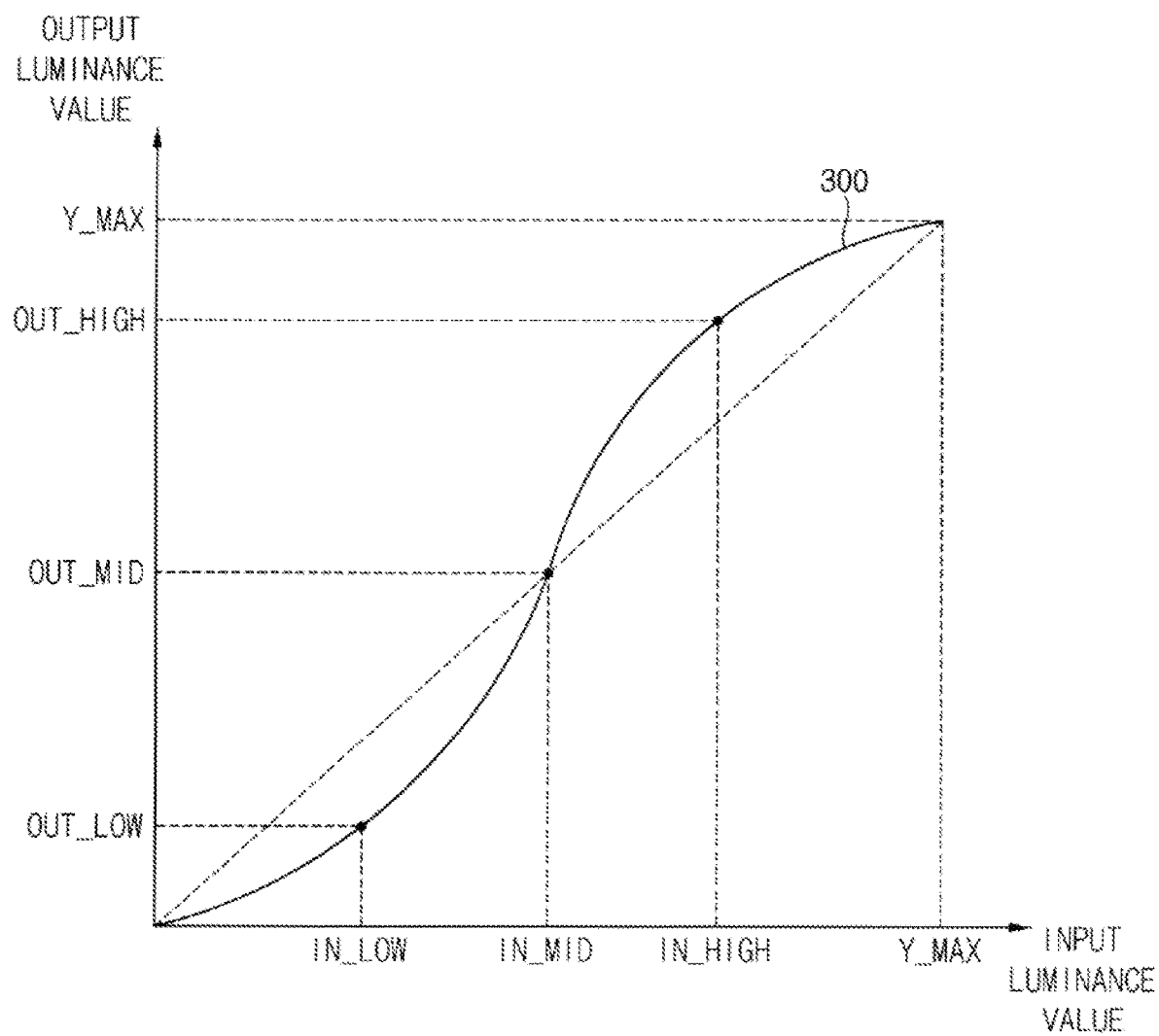
FIG. 3 illustrates an example of a post-processing function.
Figure 4A:
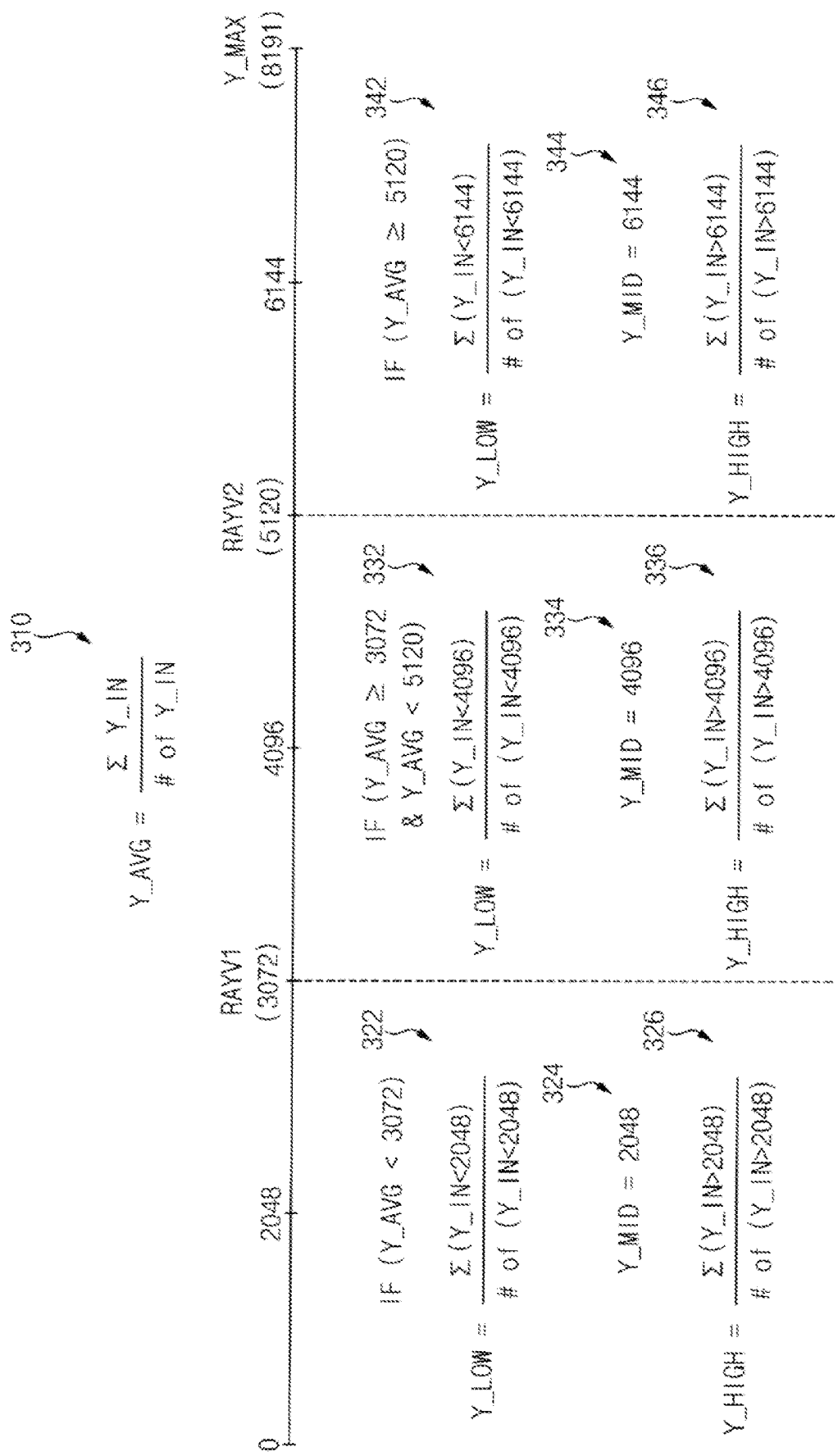
Figure 5B:
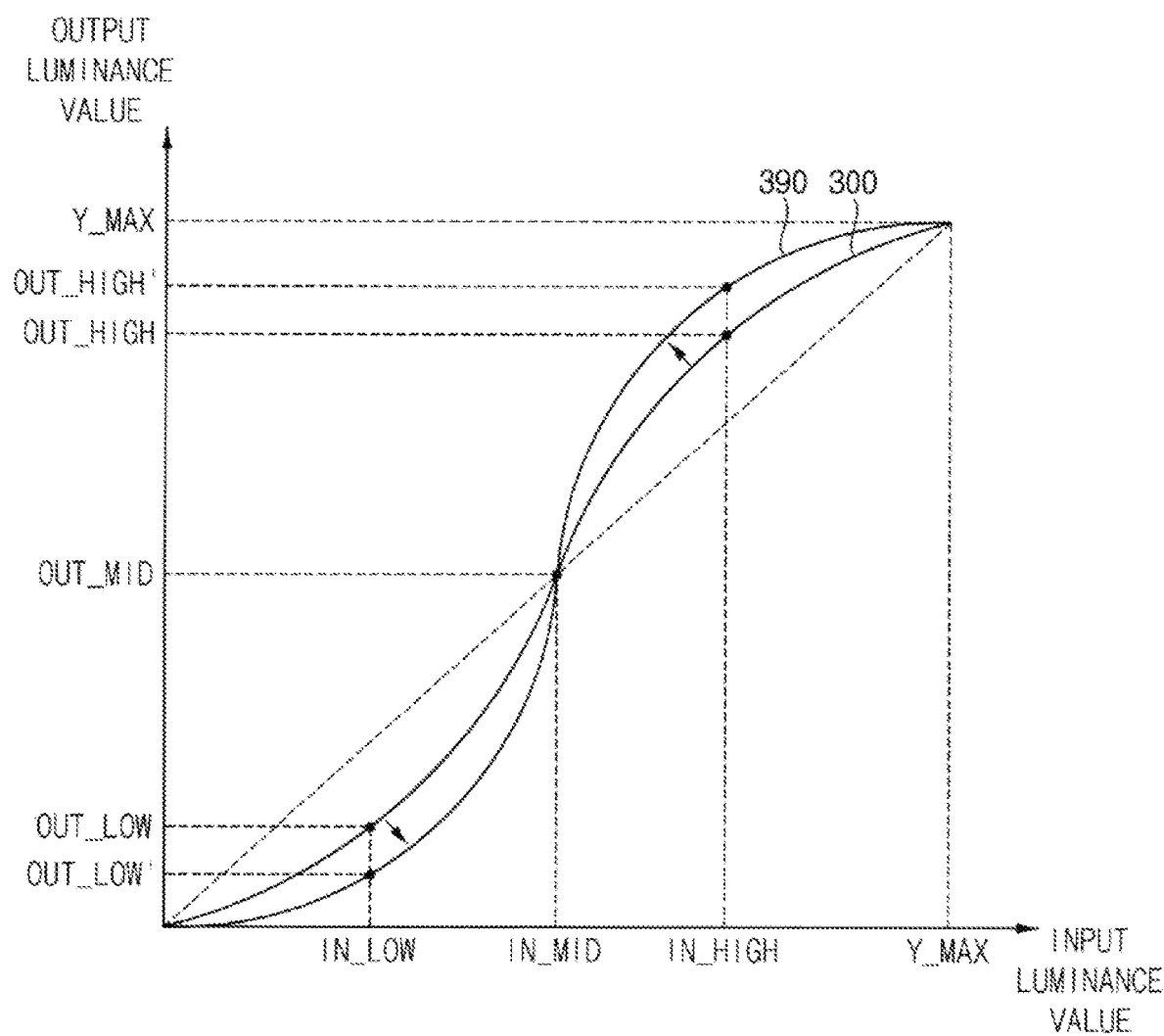
Figure 7:
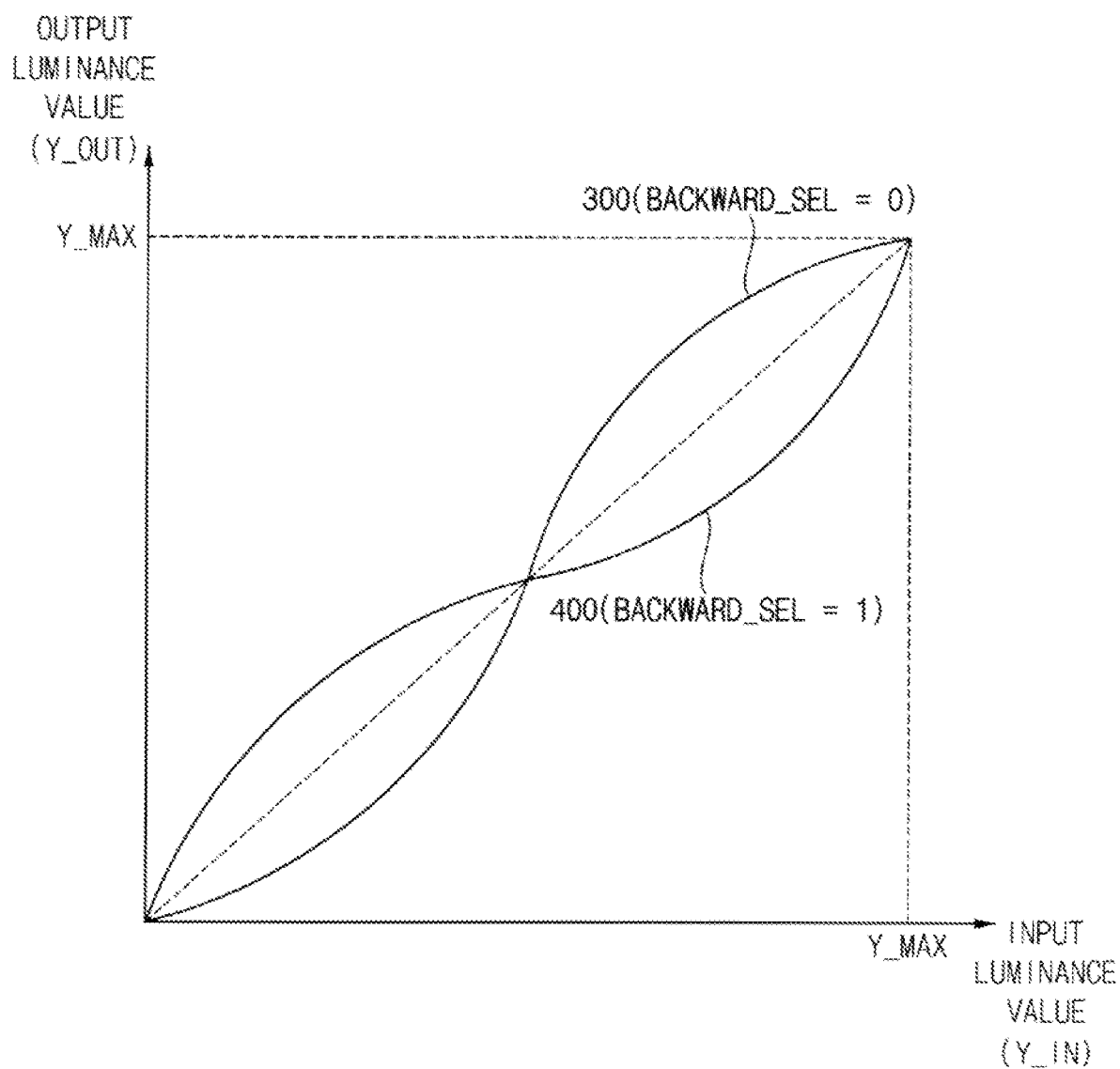
FIG. 7 illustrates example operations of an HDR post-processing processor.

The embodiments are described more fully hereinafter with reference to the accompanying drawings. Like or similar reference numerals refer to like or similar elements. FIG. 1 is a block diagram illustrating an embodiment of a high dynamic range (HDR) post-processing device. FIG. 2 is a diagram illustrating examples of luminance ranges of a standard dynamic range (SDR) image and a HDR image. FIG. 3 is a diagram describing an example of a post-processing function determined by a HDR post-processing analysis block. FIGS. 4A and 4B are diagrams describing an example operation of a HDR post-processing analysis block that determines input and output luminance values. FIGS. 5A and 5B are diagrams describing an example operation of a HDR post-processing analysis block that applies a gain coefficient to a difference between an input luminance value and an output luminance value. FIG. 6 is a diagram describing an example operation of a HDR post-processing processor that calculates an output luminance value for each input luminance value. FIG. 7 is a diagram describing examples of a post-processing function and an inverted function of the post-processing function which may be used by a HDR post-processing processor.

Referring to FIG. 1, a high dynamic range (HDR) post-processing device 100 may include a HDR post-processing analysis block 120 and a HDR post-processing processor 160. In some embodiments, as illustrated in FIG. 1, the HDR post-processing device 100 may further include an RGB-to-YCbCr converter 110 and an YCbCr-to-RGB converter 170. The HDR post-processing device 100 may be included in or coupled to a display device.

The HDR post-processing device 100 may receive input image data IDAT for a HDR image from an external host processor (e.g., application processor (AP), graphic processing unit (GPU), graphics card, etc.) or from an HDR device of a controller of the display device. In the HDR image, luminance of a low grayscale image or a low luminance image may be decreased, and luminance of a high grayscale image or a high luminance image may be increased. Accordingly, as illustrated in the example of FIG. 2, the HDR image may have a luminance distribution 230 having a dynamic range or luminance range HDR_LR greater than the dynamic range or luminance range SDR_LR of a luminance distribution 210 of a normal image or a standard dynamic range (SDR) image.

The RGB-to-YCbCr converter 110 may receive the input image data IDAT (having a format of RGB data RGB_IN) from the external host processor or from the HDR device of the controller, and may generate YCbCr data YCC_IN including luminance data and chrominance data by performing an RGB-to-YCbCr conversion operation on the input image data IDAT. The RGB-to-YCbCr converter 110 may then provide the input image data IDAT having a format of the YCbCr data YCC_IN to the HDR post-processing analysis block 120. The YCbCr data YCC_IN may include, for example, but is not limited to, the luminance data, blue chrominance data and red chrominance data.

The HDR post-processing analysis block 120 may determine a post-processing function HPP_FUNC by analyzing the input image data IDAT. In some embodiments, the post-processing function HPP_FUNC may correspond to an HDR forward process that decreases a low grayscale or a low luminance and increases a high grayscale or a high luminance. (The low grayscale or low luminance may be, for example, in a first predetermined range of grayscale values or luminances, respectively, and the high grayscale or high luminance may be in a second predetermined range of grayscale values or luminances, respectively).

As illustrated in FIG. 3, for example, an example of a post-processing function HPP_FUNC determined by HDR post-processing analysis block 120 may generate an output luminance value lower than an input luminance value, with respect to the input luminance value in a low grayscale region or a low luminance region. The post-processing function HPP_FUNC determined by HDR post-processing analysis block 120 may also generate an output luminance value higher than an input luminance value, with respect to the input luminance value in a high grayscale region or a high luminance region. Thus, in this example, the post-processing function HPP_FUNC may correspond to an S-shaped curve 300.

In some embodiments, to determine the post-processing function HPP_FUNC and provide the post-processing function HPP_FUNC to the HDR post-processing processor 160, the HDR post-processing analysis block 120 may determine the following: a low grayscale input luminance value IN_LOW, a middle grayscale input luminance value IN_MID, a high grayscale input luminance value IN_HIGH, a low grayscale output luminance value OUT_LOW, a middle grayscale output luminance value OUT_MID and a high grayscale output luminance value OUT_HIGH corresponding to the post-processing function HPP_FUNC. Also, the HDR post-processing analysis block 120 may provide the low grayscale input luminance value IN_LOW, the middle grayscale input luminance value IN_MID, the high grayscale input luminance value IN_HIGH, the low grayscale output luminance value OUT_LOW, the middle grayscale output luminance value OUT_MID and the high grayscale output luminance value OUT_HIGH to the HDR post-processing processor 160.

In some embodiments, the HDR post-processing analysis block 120 may determine a low grayscale average luminance value, a middle grayscale luminance value and a high grayscale average luminance value of the input image data IDAT by analyzing luminance values represented by the luminance data of the input image data IDAT. The HDR post-processing analysis block 120 may determine the low grayscale input luminance value IN_LOW, the middle grayscale input luminance value IN_MID, the high grayscale input luminance value IN_HIGH, the low grayscale output luminance value OUT_LOW, the middle grayscale output luminance value OUT_MID and the high grayscale output luminance value OUT_HIGH corresponding to the post-processing function HPP_FUNC based on the low grayscale average luminance value, the middle grayscale luminance value and the high grayscale average luminance value of the input image data IDAT.

As illustrated in FIG. 4A, for example, the HDR post-processing analysis block 120 may calculate an average luminance value Y_AVG of the luminance values of the input image data IDAT using equation 310: $Y\_AVG = \Sigma Y\_IN / \#of\ Y\_IN$. Here, Y_AVG may represent the average luminance value and Y_IN may represent each luminance value, or each input luminance value of the input image data IDAT.

In a case where the average luminance value Y_AVG is lower than a first reference average luminance value RAYV1 (e.g., 3,072), the HDR post-processing analysis block 120 may determine the low grayscale average luminance value Y_LOW by calculating an average value of the luminance values lower than a first reference middle luminance value (e.g., 2,048) using equation 322: $Y\_LOW = \Sigma(Y\_IN<2048) / \#of\ (Y\_IN<2048)$. In addition, the HDR post-processing analysis block 120 may determine the middle grayscale luminance value Y_MID as the first reference middle luminance value using equation 324: $Y\_MID = 2048$, and may determine the high grayscale average luminance value Y_HIGH by calculating an average value of the luminance values higher than the first reference middle luminance value using an equation 326: $Y\_HIGH=\Sigma(Y\_IN>2048)/\#of$ $(Y\_IN>2048)$. In these equations, $Y\_IN$ may represent each luminance value or each input luminance value of the input image data IDAT, $Y\_LOW$ may represent the low grayscale average luminance value, $Y\_MID$ may represent the middle grayscale luminance value, and $Y\_HIGH$ may represent the high grayscale average luminance value.

In a case where the average luminance value is higher than or equal to the first reference average luminance value RAYV1 and is lower than a second reference average luminance value RAYV2 (e.g., 5,120), the HDR post-processing analysis block 120 may determine the low grayscale average luminance value $Y\_LOW$ by calculating an average value of the luminance values lower than a second reference middle luminance value (e.g., 4,096) using equation 332: $Y\_LOW=\Sigma(Y\_IN<4096)/\#of(Y\_IN<4096)$. In addition, the HDR post-processing analysis block 120 may determine the middle grayscale luminance value $Y\_MID$ as the second reference middle luminance value using an equation 334: $Y\_MID=4096$, and may determine the high grayscale average luminance value $Y\_HIGH$ by calculating an average value of the luminance values higher than the second reference middle luminance value using equation 336: $Y\_HIGH=\Sigma(Y\_IN>4096)/\#of(Y\_IN>4096)$.

In a case where the average luminance value is higher than or equal to the second reference average luminance value RAYV2, the HDR post-processing analysis block 120 may determine the low grayscale average luminance value $Y\_LOW$ by calculating an average value of the luminance values lower than a third reference middle luminance value (e.g., 6,144) using equation 342: $Y\_LOW=\Sigma(Y\_IN<6144)/\#of(Y\_IN<6144)$. In addition, the HDR post-processing analysis block 120 may determine the middle grayscale luminance value $Y\_MID$ as the third reference middle luminance value using equation 344: $Y\_MID=6144$, and may determine the high grayscale average luminance value $Y\_HIGH$ by calculating an average value of the luminance values higher than the second reference middle luminance value using equation 346: $Y\_HIGH=\Sigma(Y\_IN>6144)/\#of(Y\_IN>6144)$.

As illustrated in FIG. 4B, for example, the HDR post-processing analysis block 120 may determine the low grayscale input luminance value IN_LOW using equation 352: $IN\_LOW=Y\_MID/2$. In addition, the HDR post-processing analysis block 120 may determine the middle grayscale input luminance value IN_MID using equation 354: $IN\_MID=Y\_MID$, and may determine the high grayscale input luminance value IN_HIGH using equation 356: $IN\_HIGH=Y\_MID+(Y\_MAX-Y\_MID)/2$. In addition, HDR post-processing analysis block 120 may determine the low grayscale output luminance value OUT_LOW using equation 362: $OUT\_LOW=IN\_LOW-|(Y\_LOW-IN\_LOW)|$, and may determine the middle grayscale output luminance value OUT_MID using equation 364: $OUT\_MID=IN\_MID$. In addition, the HDR post-processing analysis block 120 may determine the high grayscale output luminance value OUT_HIGH using equation 366: $OUT\_HIGH=IN\_HIGH+|(Y\_HIGH-IN\_HIGH)|$.

In the aforementioned equations, IN_LOW may represent the low grayscale input luminance value, IN_MID may represent the middle grayscale input luminance value, IN_HIGH may represent the high grayscale input luminance value, Y_LOW may represent the low grayscale average luminance value, Y_MID may represent the middle grayscale luminance value, Y_HIGH may represent the high grayscale average luminance value, Y_MAX may represent a maximum luminance value of the input image data IDAT or output image data ODAT, OUT_LOW may represent the low grayscale output luminance value, OUT_MID may represent the middle grayscale output luminance value, and OUT_HIGH may represent the high grayscale output luminance value.

In this manner, the HDR post-processing analysis block 120 may determine input and output luminance values IN_LOW, IN_MID, IN_HIGH, OUT_LOW, OUT_MID and OUT_HIGH suitable for the input image data IDAT, or may determine input and output luminance values IN_LOW, IN_MID, IN_HIGH, OUT_LOW, OUT_MID and OUT_HIGH corresponding to the S-shaped curve 300 for the HDR forward process. FIGS. 4A and 4B illustrate an example operation of the HDR post-processing analysis block 120 for determining input and output luminance values IN_LOW, IN_MID, IN_HIGH, OUT_LOW, OUT_MID and OUT_HIGH. The HDR post-processing analysis block 120 may determine the input and output luminance values based on different equations in another embodiment.

In some embodiments, after determining input and output luminance values IN_LOW, IN_MID, IN_HIGH, OUT_LOW, OUT_MID and OUT_HIGH, the HDR post-processing analysis block 120 may change the output luminance values OUT_LOW, OUT_MID and OUT_HIGH (or the low grayscale output luminance value OUT_LOW and the high grayscale output luminance value OUT_HIGH) using a gain coefficient. For example, in some embodiments, the HDR post-processing analysis block 120 may apply a gain coefficient to a difference between the low grayscale input luminance value IN_LOW and the low grayscale output luminance value OUT_LOW, to determine the low grayscale output luminance value OUT_LOW' which may have an increased difference with respect to the low grayscale input luminance value IN_LOW.

As illustrated in FIG. 5A, for example, the HDR post-processing analysis block 120 may calculate a low grayscale luminance difference using equation 372: $DIFF\_LOW=IN\_LOW-OUT\_LOW$, and may calculate the low grayscale output luminance value OUT_LOW having the increased difference using equation 374: $OUT\_LOW'=IN\_LOW-(DIFF\_LOW*GAIN)$. Here, IN_LOW may represent the low grayscale input luminance value, OUT_LOW may represent the low grayscale output luminance value, DIFF_LOW may represent the low grayscale luminance difference, GAIN may represent the gain coefficient, and OUT_LOW' may represent the low grayscale output luminance value having the increased difference.

Further, the HDR post-processing analysis block 120 may apply the gain coefficient to a difference between the high grayscale input luminance value IN_HIGH and the high grayscale output luminance value OUT_HIGH, to determine the high grayscale output luminance value OUT_HIGH' having an increased difference with respect to the high grayscale input luminance value IN_HIGH.

As illustrated in FIG. 5A, for example, the HDR post-processing analysis block 120 may calculate a high grayscale luminance difference using equation 382: $DIFF\_HIGH=OUT\_HIGH-IN\_HIGH$, and may calculate the high grayscale output luminance value OUT_HIGH' having the increased difference using equation 384: $OUT\_HIGH'=IN\_HIGH+(DIFF\_HIGH*GAIN)$. Here, IN_HIGH may represent the high grayscale input luminance value, OUT_HIGH may represent the high grayscale output luminance value, DIFF_HIGH may represent the high grayscale luminance difference, GAIN may represent the gain coefficient, and OUT_HIGH' may represent the high grayscale output luminance value having the increased difference.

As illustrated in FIG. 5B, in a case where the gain coefficient is applied, the low grayscale output luminance value OUT_LOW may be decreased to the low grayscale output luminance value OUT_LOW' having the increased difference, and the high grayscale output luminance value OUT_HIGH may by increased to the high grayscale output luminance value OUT_HIGH' having the increased difference. Thus, a curve 300 corresponding to input and output luminance values IN_LOW, IN_MID, IN_HIGH, OUT_LOW, OUT_MID and OUT_HIGH may be changed to a curve 390 represented by input and output luminance values IN_LOW, IN_MID, IN_HIGH, OUT_LOW', OUT_MID and OUT_HIGH'.

The HDR post-processing processor 160 may receive the post-processing function HPP_FUNC or the input and output luminance values IN_LOW, IN_MID, IN_HIGH, OUT_LOW, OUT_MID and OUT_HIGH corresponding to the post-processing function HPP_FUNC from the HDR post-processing analysis block 120. Also, the HDR post-processing processor 160 may receive a backward select signal BACKWARD_SEL from the external host processor or from a backward select signal generator of the controller. Then, the HDR post-processing processor 160 may selectively perform the HDR forward process (corresponding to the post-processing function HPP_FUNC) or an HDR backward process corresponding to an inverted function of the post-processing function HPP_FUNC) on the input image data IDAT in response to the backward select signal BACKWARD_SEL.

The value of the backward select signal BACKWARD_SEL may be determined according to one or more of the following factors: frame rate of the display device, movement amount of an object represented by the input image data IDAT, and/or an average luminance value of the input image data IDAT. Thus, in some embodiments, the backward select signal BACKWARD_SEL may have a value indicating the HDR forward process in a high frame rate, in an image having a small amount of movement, and/or in a low luminance image, and may have a value indicating the HDR backward process in a low frame rate, in an image having a large amount of movement, and/or in a high luminance image. In one embodiment, the terms low, high, large, small, and other relative terms may be determined, for example, relative to one or more corresponding predetermined reference levels.

In an example, the backward select signal BACKWARD_SEL may have a first value (e.g., '0') indicating that the HDR forward process is to be performed when the frame rate of the display device is higher than or equal to a reference frame rate, and may have a second value (e.g., '1') indicating that the HDR backward process is to be performed when the frame rate of the display device is lower than the reference frame rate.

In an example, the backward select signal BACKWARD_SEL may have the first value indicating that the HDR forward process is to be performed when the movement amount of the object represented by the input image data IDAT is less than a reference movement amount, and may have the second value indicating that the HDR backward process is to be performed when the movement amount of the object represented by the input image data IDAT is greater than or equal to the reference movement amount.

In an example, the backward select signal BACKWARD_SEL may have the first value indicating that the HDR forward process is to be performed when the average luminance value of the input image data IDAT is lower than a reference luminance value, and may have the second value indicating that the HDR backward process is to be performed when the average luminance value of the input image data IDAT is higher than or equal to than the reference luminance value.

In some embodiments, the HDR post-processing processor 160 may receive the low grayscale input luminance value IN_LOW, the middle grayscale input luminance value IN_MID, the high grayscale input luminance value IN_HIGH, the low grayscale output luminance value OUT_LOW, the middle grayscale output luminance value OUT_MID and the high grayscale output luminance value OUT_HIGH corresponding to the post-processing function HPP_FUNC from the HDR post-processing analysis block 120. The HDR post-processing processor 160 may determine a conversion difference value corresponding to the post-processing function HPP_FUNC with respect to each luminance value of the input image data IDAT, based on the low grayscale input luminance value IN_LOW, the middle grayscale input luminance value IN_MID, the high grayscale input luminance value IN_HIGH, the low grayscale output luminance value OUT_LOW, the middle grayscale output luminance value OUT_MID and the high grayscale output luminance value OUT_HIGH.

In a case where the backward select signal BACKWARD_SEL has the first value (e.g., '0'), the HDR post-processing processor 160 may calculate an output luminance value corresponding to the luminance value of the input image data IDAT by adding the conversion difference value to the luminance value of the input image data IDAT. Thus, in the case where the backward select signal BACKWARD_SEL has the first value, the HDR forward process, that decreases a low grayscale or a low luminance and increases a high grayscale or a high luminance, may be performed on the input image data IDAT. The output image data ODAT having the output luminance value may then be generated by the HDR forward process.

Further, in a case where the backward select signal BACKWARD_SEL has the second value (e.g., '1'), the HDR post-processing processor 160 may calculate the output luminance value corresponding to the luminance value of the input image data IDAT by subtracting the conversion difference value from the luminance value of the input image data IDAT. Thus, in the case where the backward select signal BACKWARD_SEL has the second value, the HDR backward process, that increases a low grayscale or a low luminance and decreases a high grayscale or a high luminance, may be performed on the input image data IDAT. The output image data ODAT having the output luminance value may then be generated by the HDR backward process.

As illustrated in FIG. 6, for example, with respect to each luminance value of the input image data IDAT lower than the middle grayscale input luminance value IN_MID, the HDR post-processing processor 160 may determine the conversion difference value for the luminance value using equation 410: $CONV\_DIFF = 2*(OUT\_LOW - IN\_LOW)*Y\_IN/IN\_LOW - (OUT\_LOW - IN\_LOW)*(Y\_IN)^2/(IN\_LOW)^2$. Here, CONV_DIFF may represent the conversion difference value, OUT_LOW may represent the low grayscale output luminance value, IN_LOW may represent the low grayscale input luminance value, and Y_IN may represent the luminance value of the input image data.

Further, with respect to each luminance value of the input image data IDAT higher than the middle grayscale input luminance value IN_MID, the HDR post-processing processor 160 may determine the conversion difference value for the luminance value using equation 430: CONV_DIFF=2*(OUT_HIGH−IN_HIGH)*(Y_IN−IN_MID)/(IN_HIGH−IN_MID)−(OUT_HIGH−IN_HIGH)*(Y_IN−IN_MID)2/(IN_HIGH−IN_MID)². Here, CONV_DIFF may represent the conversion difference value, OUT_HIGH may represent the high grayscale output luminance value, IN_HIGH may represent the high grayscale input luminance value, Y_IN may represent the luminance value of the input image data IDAT, and IN_MID may represent the middle grayscale input luminance value. With respect to each luminance value of the input image data IDAT being the middle grayscale input luminance value IN_MID, HDR post-processing processor 160 may determine the conversion difference value as zero (or 0).

In a case where the backward select signal BACKWARD_SEL has the first value, the HDR post-processing processor 160 may calculate the output luminance value corresponding to the luminance value of the input image data IDAT using equation 450: Y_OUT=Y_IN+CONV_DIFF, where Y_OUT may represent the output luminance value, Y_IN may represent the luminance value of the input image data IDAT, and CONV_DIFF may represent the conversion difference value.

Accordingly, implementing the HDR forward process to decrease a low grayscale or a low luminance and increase a high grayscale or a high luminance may be realized, and the input luminance value Y_IN of the input image data IDAT and the output luminance value Y_OUT of the output image data ODAT may have a relationship of S-shaped curve 300 corresponding to the post-processing function HPP_FUNC, for example, as illustrated in FIG. 7.

Further, in a case where the backward select signal BACKWARD_SEL has the second value, the HDR post-processing processor 160 may calculate the output luminance value corresponding to the luminance value of the input image data IDAT using equation 470: Y_OUT=Y_IN−CONV_DIFF, where Y_OUT may represent the output luminance value, Y_IN may represent the luminance value of the input image data IDAT, and CONV_DIFF may represent the conversion difference value.

Accordingly, the HDR backward process that increases a low grayscale or a low luminance and decreases a high grayscale or a high luminance may be performed, and the input luminance value Y_IN of the input image data IDAT and the output luminance value Y_OUT of the output image data ODAT may have a relationship of inverted S-shaped curve 400 corresponding to the inverted function (e.g., inverted with respect to an 'Y=X' axis) of the post-processing function HPP_FUNC, for example, as illustrated in FIG. 7.

The YcbCr-to-RGB converter 170 may receive the output image data ODAT having a format of YcbCr data YCC_OUT from the HDR post-processing processor 160, may generate RGB data RGB_OUT by performing an YcbCr-to-RGB conversion operation on the output image data ODAT, and may provide the output image data ODAT having a format of the RGB data RGB_OUT to an external device, for example a data driver of the display device.

As described above, in the HDR post-processing device 100 according to embodiments, the HDR post-processing analysis block 120 may determine the post-processing function HPP_FUNC by analyzing the input image data IDAT, and the HDR post-processing processor 160 may selectively perform the HDR forward process corresponding to the post-processing function HPP_FUNC or the HDR backward process corresponding to the inverted function of the post-processing function HPP_FUNC on the input image data IDAT in response to the backward select signal BACKWARD_SEL. Accordingly, the HDR backward process may be performed at a low frame rate, in an image having a high level of movement, and/or in a high luminance image. Thus, a judder phenomenon (where movement of the object is not continuous) may be reduced or prevented from being perceived in the HDR image.

Figure 8:
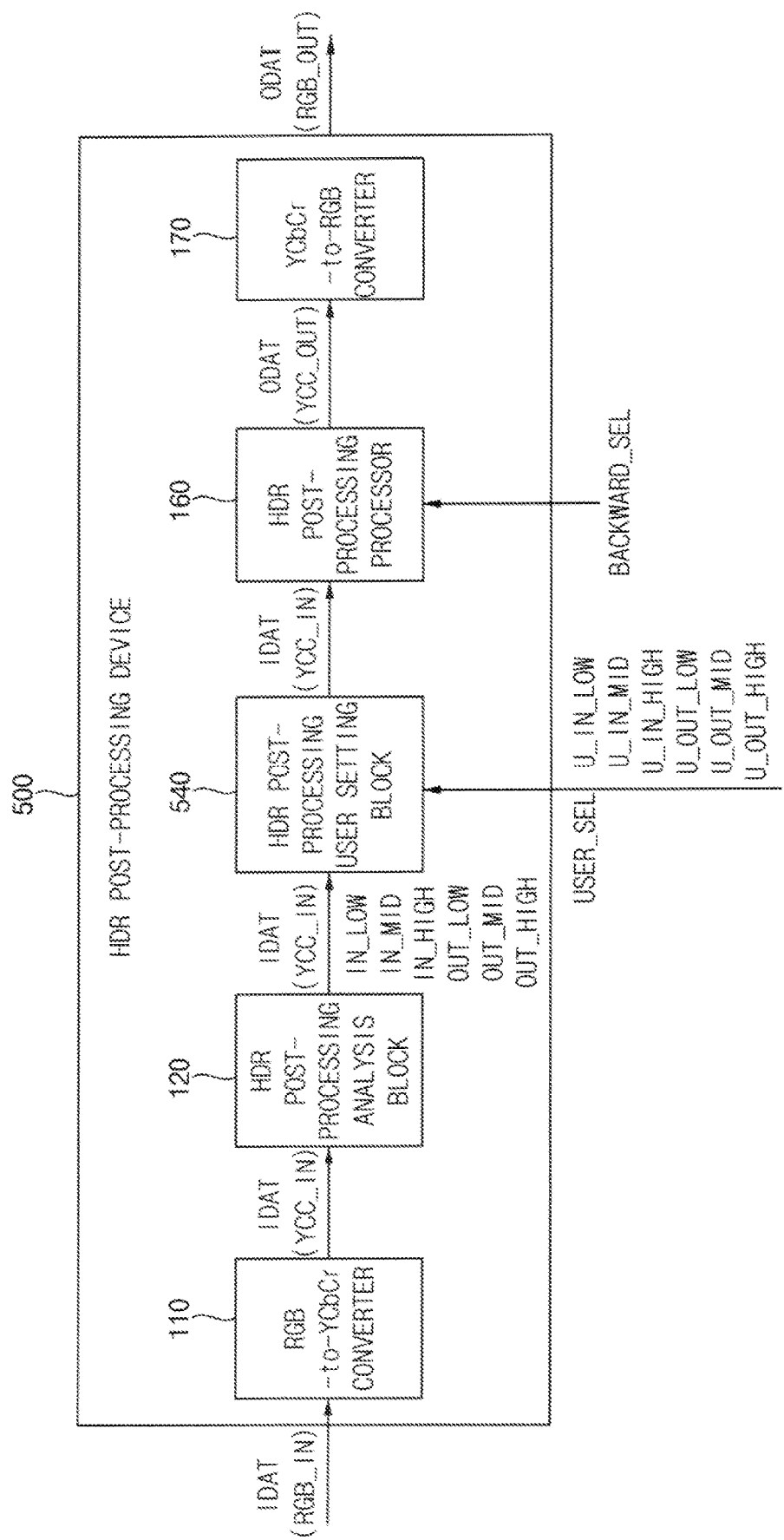
FIG. 8 illustrates an embodiment of an HDR post-processing device.
Figure 9:
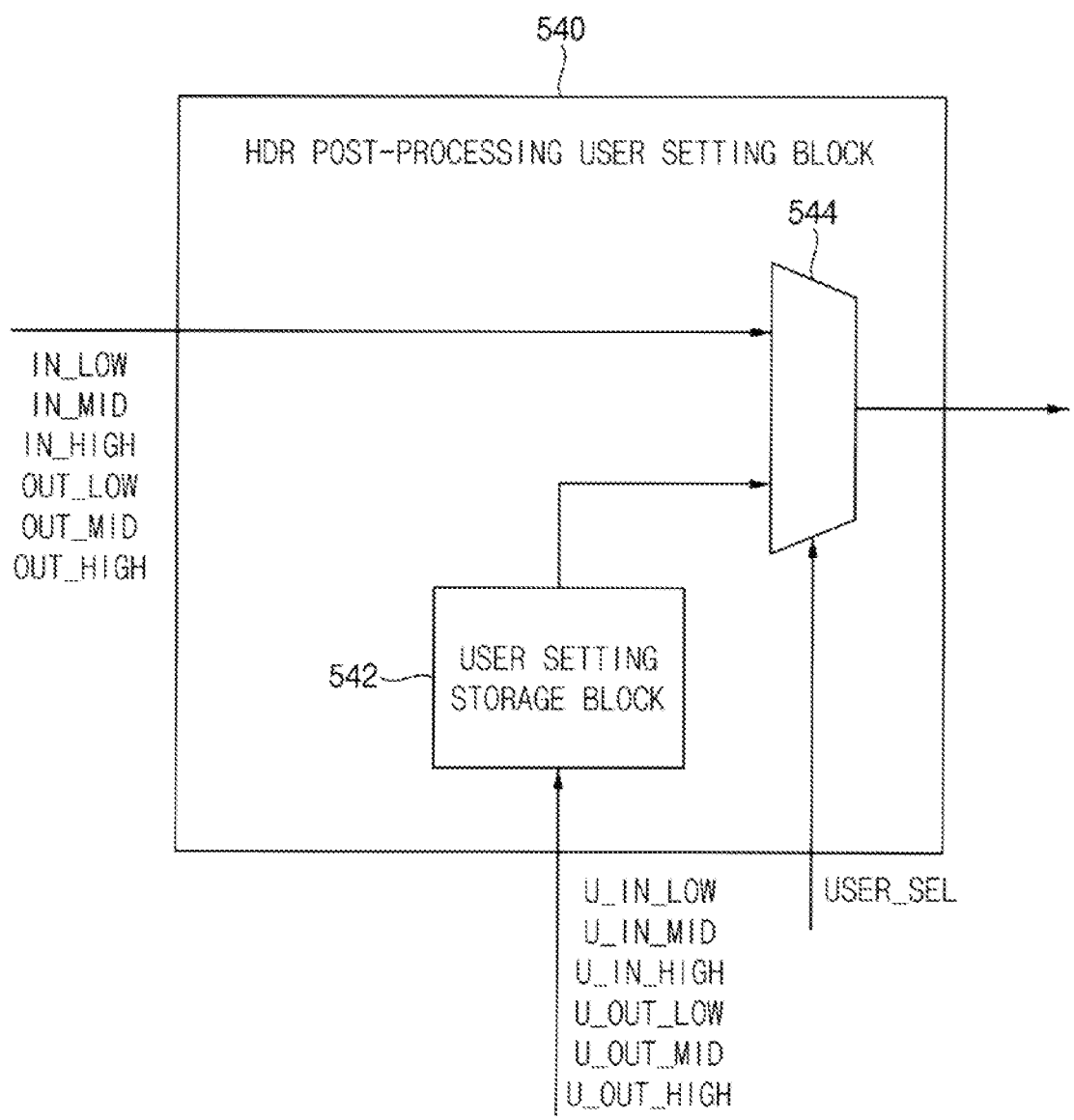
FIG. 9 illustrates an embodiment of an HDR post-processing user setting block.

FIG. 8 is a block diagram illustrating an embodiment of an HDR post-processing device 500, and FIG. 9 is a block diagram illustrating an example of an HDR post-processing user setting block.

Referring to FIG. 8, the HDR post-processing device 500 may be included in a display device, and according to embodiments may include an RGB-to-YcbCr converter 110, a HDR post-processing analysis block 120, a HDR post-processing user setting block 540, a HDR post-processing processor 160 and an YcbCr-to-RGB converter 170. The HDR post-processing device 500 of FIG. 8 may have a configuration and operation similar to a HDR post-processing device 100 of FIG. 1, except that the HDR post-processing device 500 may further include the HDR post-processing user setting block 540 between the HDR post-processing analysis block 120 and the HDR post-processing processor 160.

The HDR post-processing user setting block 540 may receive input and output luminance values IN_LOW, IN_MID, IN_HIGH, OUT_LOW, OUT_MID and OUT_HIGH corresponding to a post-processing function determined by analyzing input image data IDAT from the HDR post-processing analysis block 120. In addition, the HDR post-processing user setting block 540 may store user setting input and output luminance values U_IN_LOW, U_IN_MID, U_IN_HIGH, U_OUT_LOW, U_OUT_MID and U_OUT_HIGH set by an external host processor or a user setting, and may selectively provide the input and output luminance values IN_LOW, IN_MID, IN_HIGH, OUT_LOW, OUT_MID and OUT_HIGH or the user setting input and output luminance values U_IN_LOW, U_IN_MID, U_IN_HIGH, U_OUT_LOW, U_OUT_MID and U_OUT_HIGH to the HDR post-processing processor 160 in response to a user setting signal USER_SEL from the external host processor or a controller of the display device.

As illustrated in FIG. 9, in some embodiments, the HDR post-processing user setting block 540 may include a user setting storage block 542 and a multiplexer 544. The user setting storage block 542 may store the user setting input and output luminance values U_IN_LOW, U_IN_MID, U_IN_HIGH, U_OUT_LOW, U_OUT_MID and U_OUT_HIGH set by the external host processor or the user setting. The multiplexer 544 may receive the input and output luminance values IN_LOW, IN_MID, IN_HIGH, OUT_LOW, OUT_MID and OUT_HIGH corresponding to the post-processing function from the HDR post-processing analysis block 120 and may receive the user setting input and output luminance values U_IN_LOW, U_IN_MID, U_IN_HIGH, U_OUT_LOW, U_OUT_MID and U_OUT_HIGH from the user setting storage block 542. The multiplexer 544 may then selectively output the input and output luminance values IN_LOW, IN_MID, IN_HIGH, OUT_LOW, OUT_MID and OUT_HIGH or the user setting input and output luminance values U_IN_LOW, U_IN_MID, U_IN_HIGH, U_OUT_LOW, U_OUT_MID and U_OUT_HIGH to the HDR post-processing processor 160 in response to the user setting signal USER_SEL.

The HDR post-processing processor 160 may receive the input and output luminance values IN_LOW, IN_MID, IN_HIGH, OUT_LOW, OUT_MID and OUT_HIGH corresponding to the post-processing function or the user setting input and output luminance values U_IN_LOW, U_IN_MID, U_IN_HIGH, U_OUT_LOW, U_OUT_MID and U_OUT_HIGH corresponding to a user setting function from the HDR post-processing user setting block 540. In a case where the input and output luminance values IN_LOW, IN_MID, IN_HIGH, OUT_LOW, OUT_MID and OUT_HIGH are received, the HDR post-processing processor 160 may selectively perform a HDR forward process corresponding to the post-processing function or a HDR backward process corresponding to an inverted function of the post-processing function on the input image data IDAT in response to a backward select signal BACKWARD_SEL. In a case where the user setting input and output luminance values U_IN_LOW, U_IN_MID, U_IN_HIGH, U_OUT_LOW, U_OUT_MID and U_OUT_HIGH are received, the HDR post-processing processor 160 may selectively perform a process corresponding to the user setting function or a process corresponding to an inverted function of the user setting function on the input image data IDAT in response to the backward select signal BACKWARD_SEL.

Figure 10:
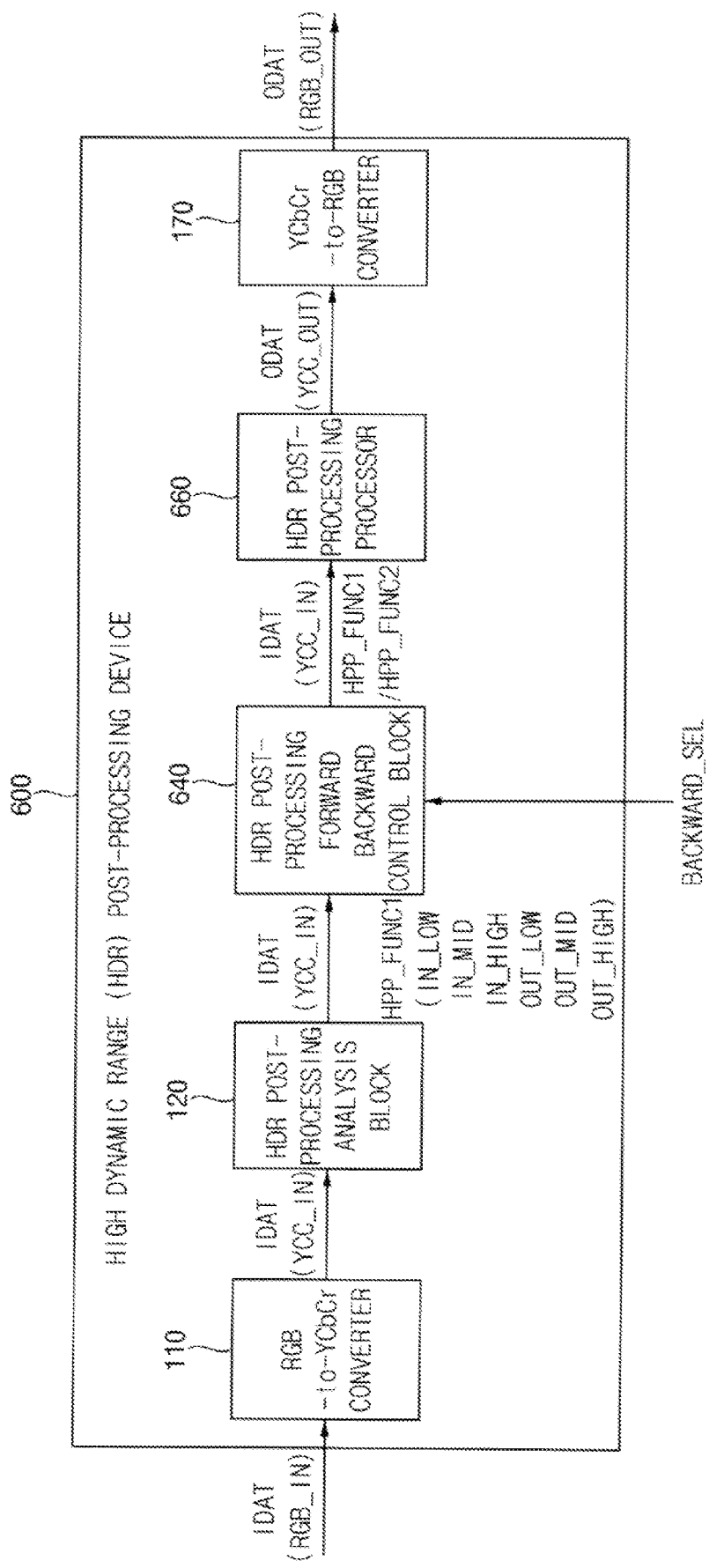
FIG. 10 illustrates an embodiment of an HDR post-processing device.
Figure 11:
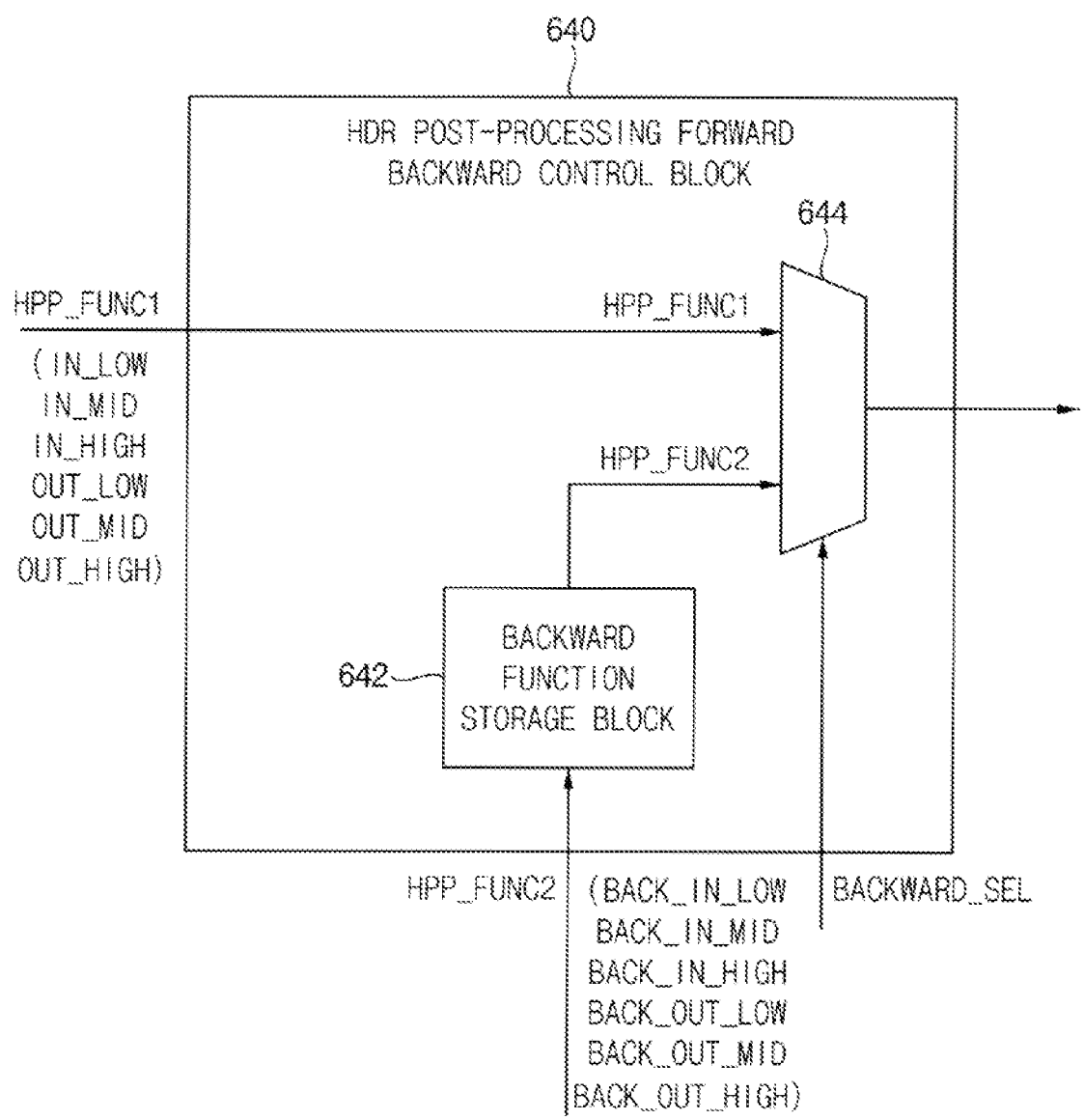
FIG. 11 illustrates an embodiment of an HDR post-processing forward backward control block.

FIG. 10 is a block diagram illustrating an embodiment of a HDR post-processing device 600, and FIG. 11 is a block diagram illustrating an example of a HDR post-processing forward backward control block.

Referring to FIG. 10, the HDR post-processing device 600 may be included or coupled to a display device, and according to embodiments may include an RGB-to-YcbCr converter 110, a HDR post-processing analysis block 120, a HDR post-processing forward backward control block 640, a HDR post-processing processor 660 and an YcbCr-to-RGB converter 170. The HDR post-processing device 600 of FIG. 10 may have a configuration and operation similar to HDR post-processing device 100 of FIG. 1, with an exception. The HDR post-processing forward backward control block 640 may determine a HDR forward process corresponding to a first post-processing function HPP_FUNC1, or a HDR backward process corresponding to a second post-processing function HPP_FUNC2, in response to a backward select signal BACKWARD_SEL. The HDR post-processing processor 660 may then perform the HDR forward process or the HDR backward process determined by the HDR post-processing forward backward control block 640.

The HDR post-processing forward backward control block 640 may receive the first post-processing function HPP_FUNC1 for the HDR forward process determined by analyzing input image data IDAT from the HDR post-processing analysis block 120, and may store the second post-processing function HPP_FUNC2 for the HDR backward process previously determined by an external host processor or by a controller of the display device. The HDR post-processing forward backward control block 640 may selectively provide the first post-processing function HPP_FUNC1 for the HDR forward process or the second post-processing function HPP_FUNC2 for the HDR backward process to the HDR post-processing processor 660, in response to the backward select signal BACKWARD_SEL from the external host processor or the controller.

In some embodiments, as illustrated in FIG. 1, the HDR post-processing forward backward control block 640 may include a backward function storage block 642 and a multiplexer 644. The backward function storage block 642 may store second input and output luminance values BACK_IN_LOW, BACK_IN_MID, BACK_IN_HIGH, BACK_OUT_LOW, BACK_OUT_MID and BACK_OUT_HIGH corresponding to the second post-processing function HPP_FUNC2 previously determined by the external host processor or controller.

The multiplexer 644 may receive first input and output luminance values IN_LOW, IN_MID, IN_HIGH, OUT_LOW, OUT_MID and OUT_HIGH corresponding to the first post-processing function HPP_FUNC1 for the HDR forward process from the HDR post-processing analysis block 120, and may receive the second input and output luminance values BACK_IN_LOW, BACK_IN_MID, BACK_IN_HIGH, BACK_OUT_LOW, BACK_OUT_MID and BACK_OUT_HIGH corresponding to the second post-processing function HPP_FUNC2 for the HDR backward process from the backward function storage block 642. The multiplexer 644 may then selectively output the first input and output luminance values IN_LOW, IN_MID, IN_HIGH, OUT_LOW, OUT_MID and OUT_HIGH corresponding to the first post-processing function HPP_FUNC1 for the HDR forward process or the second input and output luminance values BACK_IN_LOW, BACK_IN_MID, BACK_IN_HIGH, BACK_OUT_LOW, BACK_OUT_MID and BACK_OUT_HIGH corresponding to the second post-processing function HPP_FUNC2 for the HDR backward process to the HDR post-processing processor 660 in response to the backward select signal BACKWARD_SEL.

The HDR post-processing processor 660 may perform the HDR forward process or the HDR backward process determined by the HDR post-processing forward backward control block 640. In a case where the first post-processing function HPP_FUNC1 for the HDR forward process is selected by the HDR post-processing forward backward control block 640, the HDR post-processing processor 660 may perform the HDR forward process corresponding to the first post-processing function HPP_FUNC1 on the input image data IDAT. Further, in a case where the second post-processing function HPP_FUNC2 for the HDR backward process is selected by the HDR post-processing forward backward control block 640, the HDR post-processing processor 660 may perform the HDR backward process corresponding to the second post-processing function HPP_FUNC2 on the input image data IDAT.

Figure 12:
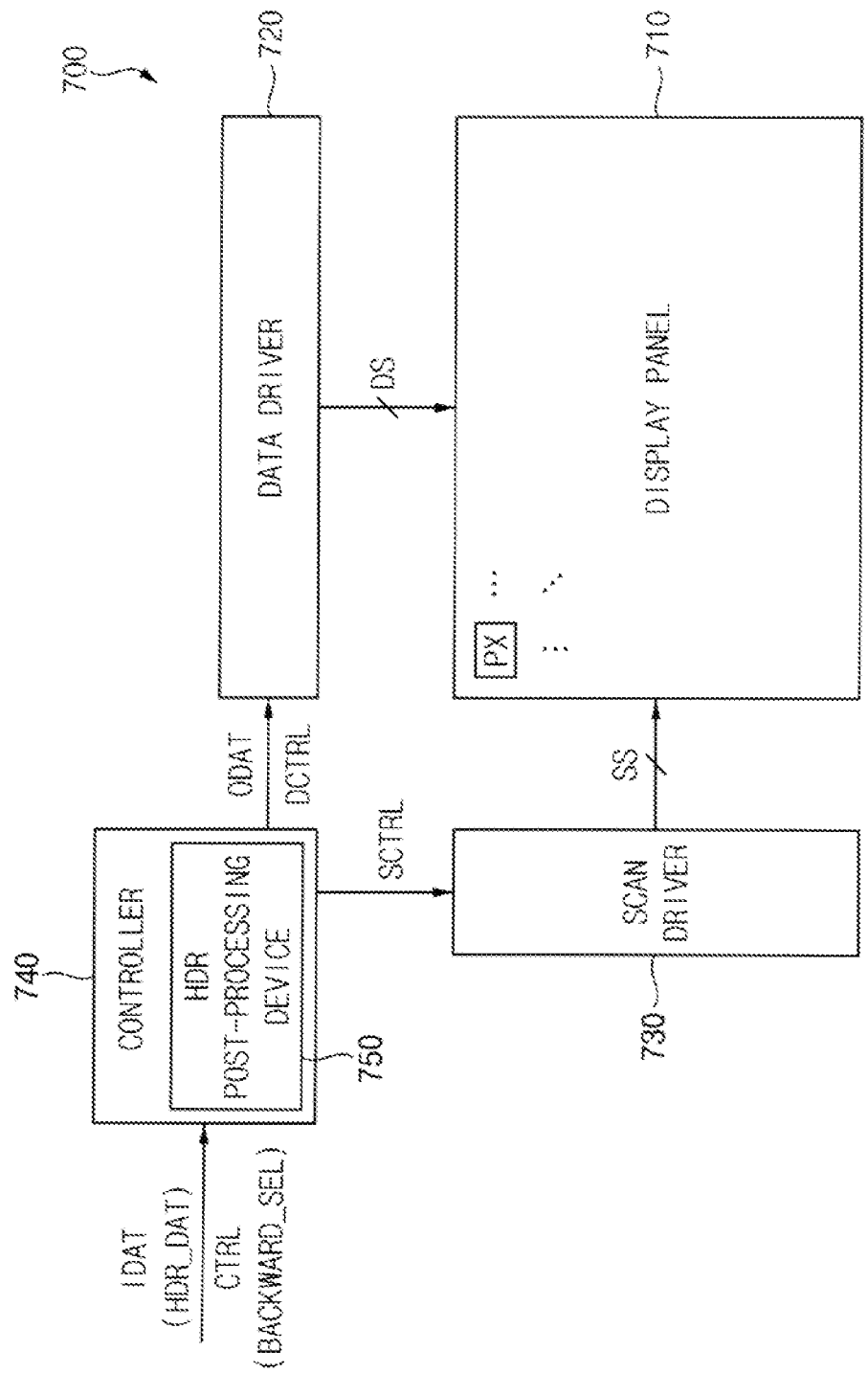
FIG. 12 illustrates an embodiment of a display device.

FIG. 12 is a block diagram illustrating an embodiment of a display device 700, which may include a display panel 710 having a plurality of pixels PX, a data driver 720 that provides data signals DS to the plurality of pixels PX, a scan driver 730 that provides scan signals SS to the plurality of pixels PX, and a controller 740 that controls the data driver 720 and the scan driver 730.

The display panel 710 may include a plurality of data lines, a plurality of scan lines, and the plurality of pixels PX coupled to the data lines and scan lines. In some embodiments, each pixel PX may include at least one capacitor, at least two transistors, and an organic light emitting diode (OLED). The display panel 710 may be, for example, an organic light emitting display (OLED) panel. In other embodiments, the display panel 710 may be a liquid crystal display (LCD) panel or another type of display panel.

The data driver 720 may generate the data signals DS based on a data control signal DCTRL and output image data ODAT received from the controller 740, and may provide the data signals DS corresponding to the output image data ODAT to the pixels PX through the data lines. In some embodiments, the data control signal DCTRL may include, but is not limited to, an output data enable signal, a horizontal start signal, a load signal, and/or a different signal. In some embodiments, the data driver 720 and the controller 740 may be implemented as a single integrated circuit. The single integrated circuit may be referred to, for example, as a timing controller embedded data driver (TED). In other embodiments, the data driver 720 and the controller 740 may be implemented with separate integrated circuits.

The scan driver 730 may generate the scan signals SS based on a scan control signal SCTRL received from the controller 740, and may sequentially provide the scan signals SS to the pixels PX through the scan lines on a row-by-row basis. In some embodiments, the scan control signal SCTRL may include, but is not limited to, a scan start signal, a scan clock signal, and/or another signal. In some embodiments, the scan driver 730 may be integrated or included in a peripheral portion of the display panel 710. In other embodiments, the scan driver 730 may be implemented with one or more integrated circuits.

The controller 740 (e.g., a timing controller (TCON)) may receive input image data IDAT and a control signal CTRL from an external host processor (e.g., an application processor (AP), a graphic processing unit (GPU), graphics card). In some embodiments, the control signal CTRL may include a backward select signal BACKWARD_SEL for selecting a HDR forward process or a HDR backward process for the input image data IDAT. In some embodiments, the control signal CTRL may further include, but is not limited to, a vertical synchronization signal, a horizontal synchronization signal, an input data enable signal, a master clock signal, and/or another signal. The controller 740 may generate the output image data ODAT, the data control signal DCTRL and the scan control signal SCTRL based on the input image data IDAT and the control signal CTRL. The controller 740 may control the data driver 720 by providing the output image data ODAT and the data control signal DCTRL to the data driver 720, and may control the scan driver 730 by providing the scan control signal SCTRL to the scan driver 730.

The controller 740 of the display device 700 according to embodiments may receive, as the input image data IDAT, HDR image data HDR DAT representing a HDR image from the external host processor. The HDR image may have an extended dynamic range compared with a normal image or an SDR image, and an image quality of the display device 700 displaying the HDR image may be improved compared with a display device displaying the normal image or the SDR image. However, unlike the SDR image, a judder phenomenon (where an object unnaturally moves or movements of the object are not continuous) may tend to occur in the HDR image.

To prevent a judder phenomenon from occurring, the controller 740 may include a HDR post-processing device 750. According to embodiments, the HDR post-processing device 750 may be a HDR post-processing device 100 of FIG. 1, a HDR post-processing device 500 of FIG. 8, a HDR post-processing device 600 of FIG. 10, or the like.

The HDR post-processing device 750 may receive a backward select signal BACKWARD_SEL, may determine a post-processing function by analyzing the input image data IDAT, and may selectively perform a HDR forward process corresponding to the post-processing function or a HDR backward process corresponding to an inverted function of the post-processing function on the input image data IDAT in response to the backward select signal BACKWARD_SEL. Accordingly, the HDR backward process may be performed in a low frame rate, in an image having a high level of movement, and/or in a high luminance image. Thus, a judder phenomenon (where movement of an object is not continuous) may be reduced or prevented from being perceived in the HDR image.

Figure 13:
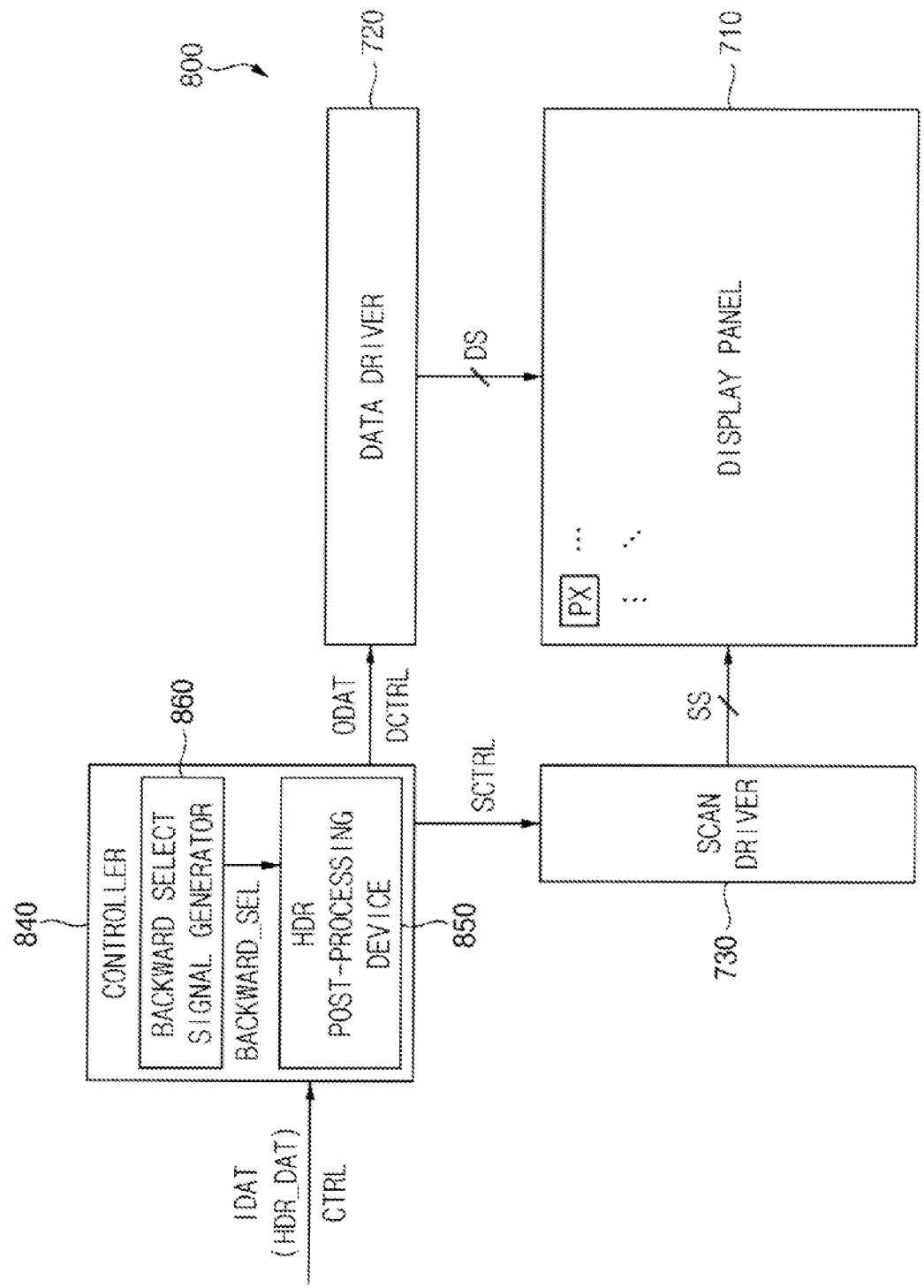
FIG. 13 illustrates an embodiment of a display device.
Figure 14A:
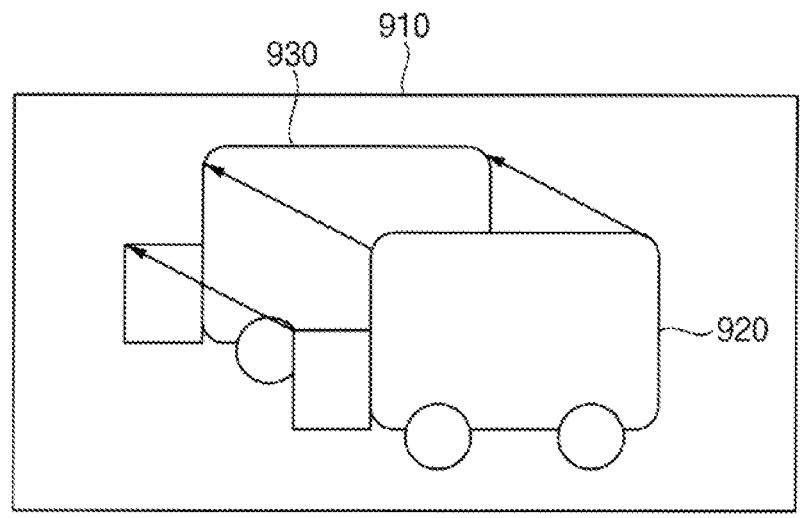
FIG. 14A illustrates an example of an image in a low frame rate or an image having a great movement.
Figure 14B:
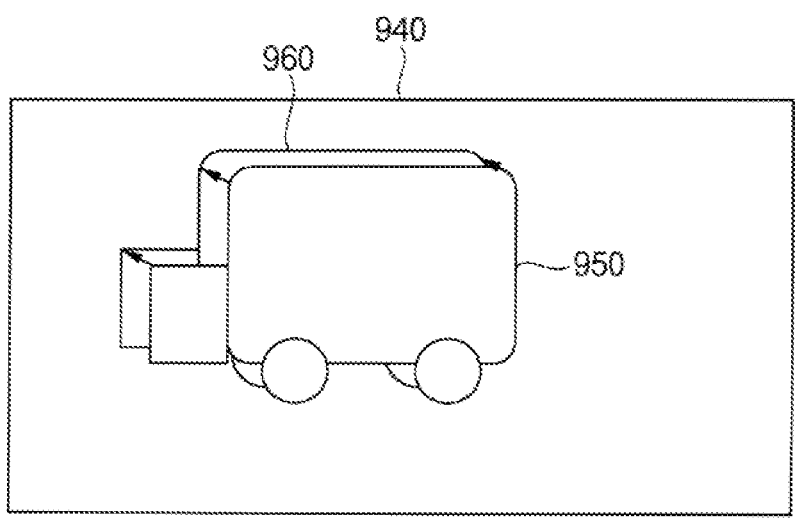
FIG. 14B illustrates an example of an image in a high frame rate or an image having a small movement.

FIG. 13 is a block diagram illustrating an embodiment of a display device 800. FIG. 14A is a diagram illustrating an example of an image in a low frame rate or an image having a large amount of movement, and FIG. 14B is a diagram illustrating an example of an image in a high frame rate or an image having a small amount of movement.

Referring to FIG. 13, according to embodiments, the display device 800 may include a display panel 710, a data driver 720, a scan driver 730 and a controller 840. The controller 840 may include a HDR post-processing device 850 and a backward select signal generator 860. The display device 800 of FIG. 13 may have a configuration and operation similar to display device 700 of FIG. 12, except that controller 840 may not receive a backward select signal BACKWARD_SEL from an external host processor and may include the backward select signal generator 860 for generating the backward select signal BACKWARD_SEL.

The backward select signal generator 860 may generate the backward select signal BACKWARD_SEL indicating a HDR forward process or a HDR backward process according to a frame rate of the display device 800, the amount of movement of an object represented by input image data IDAT, and/or an average luminance value of the input image data IDAT.

In some embodiments, the backward select signal generator 860 may detect a frame rate of the display device 800, may generate the backward select signal BACKWARD_SEL having a first value indicating that the HDR forward process is to be performed when the frame rate is higher than or equal to a reference frame rate, and may generate the backward select signal BACKWARD_SEL having a second value indicating that the HDR backward process is to be performed when the frame rate is lower than the reference frame rate. The HDR post-processing device 850 may selectively perform the HDR forward process or the HDR backward process in response to the backward select signal BACKWARD_SEL.

As illustrated in FIGS. 14A and 14B, even if display device 800 displays HDR images 910 and 940 having substantially the same movement amount, the amount of movement of object 920 and 930 in the HDR image 910 in previous and current frames (in a case where display device 800 displays the HDR image 910 at a low frame rate (e.g., about 30 Hz)) may be greater than the amount of movement of object 950 and 960 in the HDR image 940 in previous and current frames (in a case where display device 800 displays HDR image 940 at a high frame rate (e.g., about 120 Hz)). Accordingly, in the low frame rate, a judder phenomenon (where movements of object 920 and 930 are not continuous) may be perceived in the HDR image 910.

However, in display device 800 according to embodiments, the backward select signal generator 860 may generate the backward select signal BACKWARD_SEL having the second value in a case where display device 800 displays HDR image 910 at a low frame rate. Also, the HDR post-processing device 850 may perform the HDR backward process in response to the backward select signal BACKWARD_SEL having the second value. Accordingly, in the HDR image 910 displayed based on the output image data ODAT on which the HDR backward process is performed, the dynamic range of the HDR image 910 may be decreased and the judder phenomenon may be reduced or prevented from being perceived in the HDR image 910.

In other embodiments, the backward select signal generator 860 may detect the amount of movement of an object represented by input image data IDAT, may generate the backward select signal BACKWARD_SEL having a first value indicating that the HDR forward process is to be performed when the movement amount of the object is less than a reference movement amount, and may generate the backward select signal BACKWARD_SEL having a second value indicating that the HDR backward process is to be performed when the amount of movement of the object is greater than or equal to the reference movement amount. As illustrated in FIGS. 14A and 14B, a judder phenomenon may be perceived in the HDR image 910 where an object 920 and 930 has a large amount of movement, even if the display device 800 displays HDR images 910 and 940 at substantially the same frame rate.

However, in the display device 800 according to embodiments, the backward select signal generator 860 may generate the backward select signal BACKWARD_SEL having the second value in a case where the display device 800 displays the HDR image 910 where the object 920 and 930 has the great movement. Also, the HDR post-processing device 850 may perform the HDR backward process in response to backward select signal BACKWARD_SEL having the second value. Accordingly, in the HDR image 910 displayed based on the output image data ODAT on which the HDR backward process is performed, the dynamic range of the HDR image 910 may be decreased and thus a judder phenomenon may be reduced or prevented from being perceived in the HDR image 910.

In some embodiments, the backward select signal generator 860 may calculate an average luminance value of the input image data IDAT, and may generate the backward select signal BACKWARD_SEL having a first value indicating that the HDR forward process is to be performed when the average luminance value is lower than a reference luminance value. Further, the backward select signal generator 860 may generate the backward select signal BACKWARD_SEL having a second value indicating that the HDR backward process is to be performed when the average luminance value is higher than or equal to than the reference luminance value. In this case, there is a tendency for a judder phenomenon to be perceived in a high luminance image.

However, in the display device 800 according to embodiments, the backward select signal generator 860 may generate the backward select signal BACKWARD_SEL having the second value in a case where display device 800 displays the high luminance image. Also, the HDR post-processing device 850 may perform the HDR backward process in response to the backward select signal BACKWARD_SEL having the second value. Accordingly, in the HDR image 910 displayed based on the output image data ODAT on which the HDR backward process is performed, the dynamic range of the high luminance image may be decreased and thus a judder phenomenon may be reduced or prevented from being perceived in the high luminance image.

Figure 15:
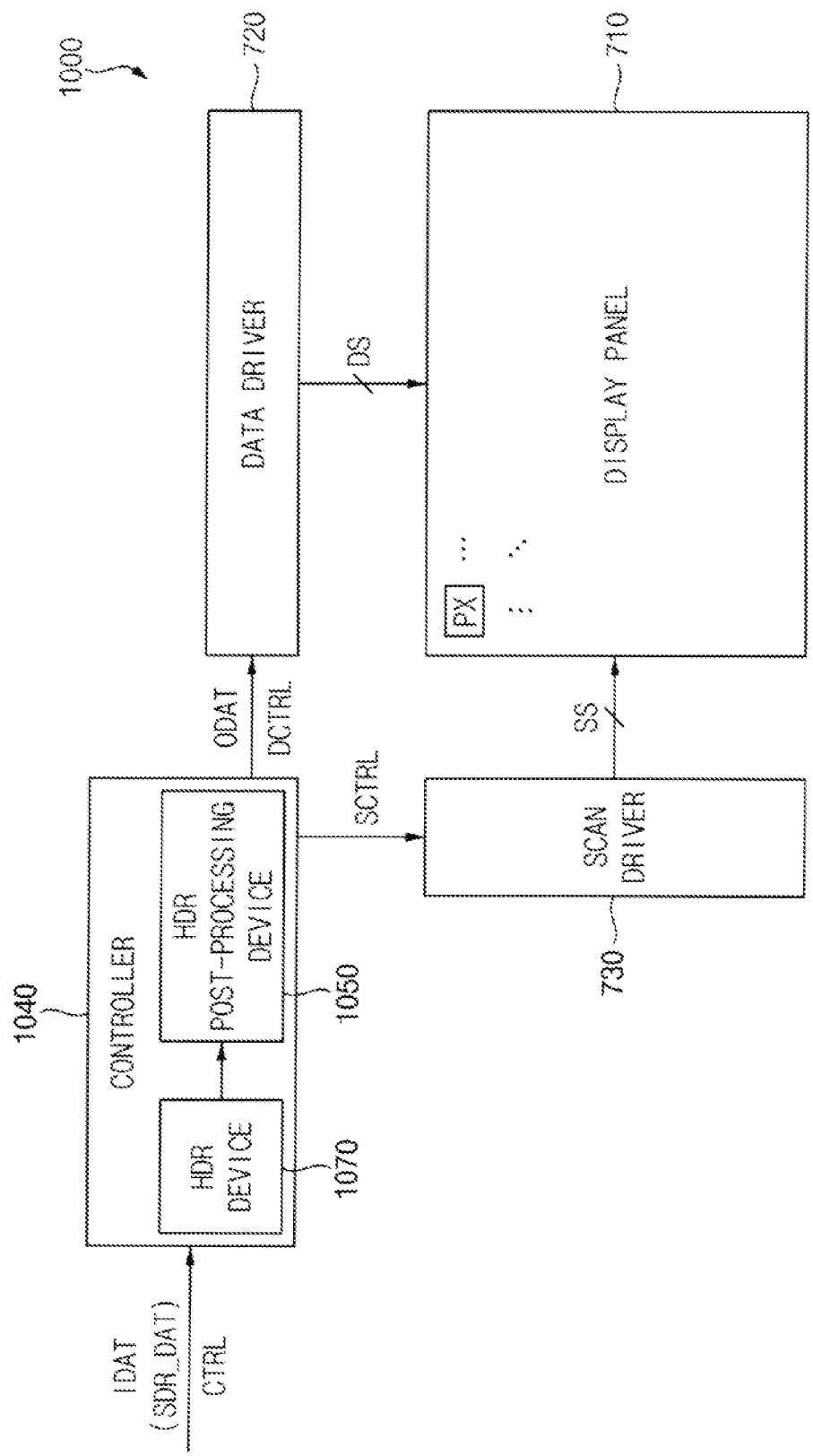
FIG. 15 illustrates an embodiment of a display device.

FIG. 15 is a block diagram illustrating an embodiment of a display device 1000, which may include a display panel 710, a data driver 720, a scan driver 730 and a controller 1040. The display device 1000 of FIG. 15 may have a configuration and operation similar to a display device 700 of FIG. 12, except that the controller 1040 may receive, as input image data IDAT, SDR image data SDR DAT representing an SDR image, instead of HDR image data HDR DAT representing a HDR image from an external host processor. Also, the controller 1040 may include a HDR device 1070 and a HDR post-processing device 1050. The HDR device 1070 may perform an HDR process on the input image data IDAT.

The HDR device 1070 may receive the SDR image data SDR DAT representing the SDR image as the input image data IDAT, may perform the HDR process on the input image data IDAT, and may provide the input image data IDAT on which the HDR process is performed to the HDR post-processing device 1050. In some embodiments, the HDR process may be, but is not limited to, a process that decreases a low grayscale or a low luminance and increases a high grayscale or a high luminance. The HDR post-processing device 1050 may selectively perform a HDR forward process that further decreases the low grayscale or the low luminance and further increases the high grayscale or the high luminance or a HDR backward process that increases the low grayscale or the low luminance and decreases the high grayscale or the high luminance on the input image data IDAT on which the HDR process is performed.

In the display device 1000 according to embodiments, the HDR backward process may be performed in a low frame rate (e.g., below a predetermined level), in an image having a large amount of movement (e.g., above a predetermined level), and/or in a high luminance image (e.g., above a predetermined level). Thus, a judder phenomenon (where movement of an object does not appear as continuous) may be reduced or prevented from being perceived in a HDR image.

Figure 16:
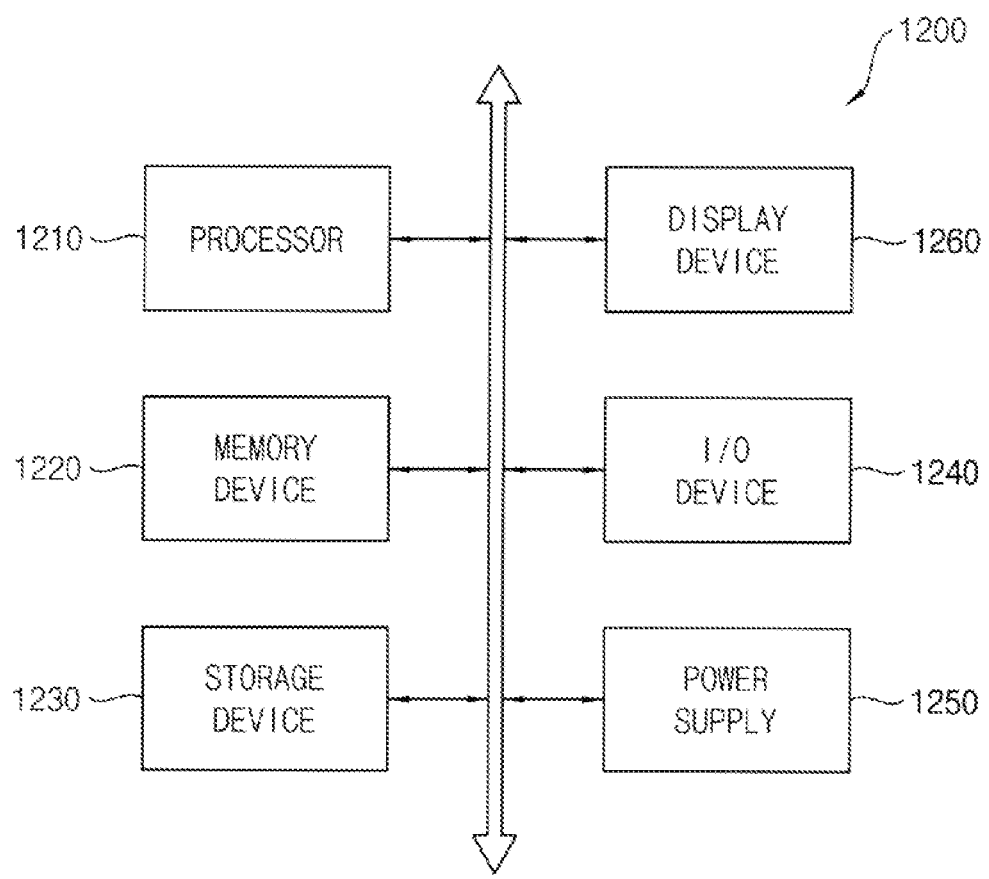
FIG. 16 illustrates an embodiment of an electronic device.

FIG. 16 is a block diagram illustrating an embodiment of an electronic device 1200, which may include a processor 1210, a memory device 1220, a storage device 1230, an input/output (I/O) device 1240, a power supply 1250, and a display device 1260. The electronic device 1200 may further include a plurality of ports for communicating a video card, a sound card, a memory card, a universal serial bus (USB) device, and/or other electric devices.

The processor 1210 may perform various computing functions or tasks. The processor 1210 may be an application processor (AP), a micro processor, a central processing unit (CPU), or other processing logic. The processor 1210 may be coupled to other components via an address bus, a control bus, a data bus, etc. Further, in some embodiments, the processor 1210 may be further coupled to an extended bus such as a peripheral component interconnection (PCI) bus.

The memory device 1220 may store data for operations of the electronic device 1200. The memory device 1220 may include, for example, at least one non-volatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, or a mobile dynamic random access memory (mobile DRAM) device.

The storage device 1230 may be a solid state drive (SSD) device, a hard disk drive (HDD) device, a CD-ROM device, or another type of storage device. The I/O device 1240 may be an input device. Examples include a keyboard, a keypad, a mouse, a touch screen, etc, and an output device such as a printer, a speaker, etc. The power supply 1250 may supply power for operation of the electronic device 1200. The display device 1260 may be coupled to other components through the buses or other communication links.

In the display device 1260, a HDR post-processing device may receive a backward select signal, determine a post-processing function by analyzing input image data, and selectively perform a HDR forward process corresponding to the post-processing function or a HDR backward process corresponding to an inverted function of the post-processing function on the input image data in response to the backward select signal. Accordingly, the HDR backward process may be performed in a low frame rate, in an image having a large amount of movement, and/or in a high luminance image, to reduce or prevent a judder phenomenon from being perceived in a HDR image.

One or more embodiments of the inventive concepts may be applied to any type of display device 1260 and any type of electronic device 1200 including display device 1260. For example, embodiments of the inventive concepts may be applied to a mobile phone, a smart phone, a tablet computer, a television (TV), a digital TV, a 3D TV, a wearable electronic device, a personal computer (PC), a home appliance, a laptop computer, a personal digital assistant (PDA), a portable multimedia player (PMP), a digital camera, a music player, a portable game console, a navigation device, etc.

In accordance with embodiments described herein, relative terms such as "low," "middle" and "high" may be expressed, for example, as "first," "second" and "third," respectively.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor to perform the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

For example, in one embodiment, a non-transitory computer-readable medium stores instructions, which, when executed by one or more processors or logic as described herein, causes the one or more processors or logic to analyze image data to determine a post-processing function and selectively perform a high dynamic range (HDR) forward process or an HDR backward process on the image data in response to a backward select signal. The HDR forward process may correspond to the post-processing function, and the HDR backward process may correspond to an inverted function of the post-processing function. The instructions may also cause the one or more processors or logic to perform operations according to any of the embodiments described herein.

The controllers, processors, devices, modules, units, blocks, converters, multiplexers, generators, logic, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, blocks, converters, multiplexers, generators, logic, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, blocks, converters, multiplexers, generators, logic, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of embodiments and is not to be construed as limiting thereof. Although a few embodiments have been described, those skilled in the art will readily appreciate that many modifications are possible in the embodiments without materially departing from the novel teachings of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. The embodiments may be combined to form additional embodiments.

What is claimed is:

1. A system, comprising:
   first logic configured to analyze image data to determine a post-processing function; and
   a processor configured to receive a backward select signal and to selectively perform a high dynamic range (HDR) forward process or an HDR backward process on the image data in response to the backward select signal, wherein the HDR forward process corresponds to the post-processing function and includes decreasing low grayscale or low luminance values and increasing high grayscale or high luminance values in the image data, and wherein the HDR backward process corresponds to an inverted function of the post-processing function.

2. The system of claim 1, wherein the first logic is configured to:

determine a first grayscale average luminance value, a second grayscale luminance value, and a third grayscale average luminance value of the image data by analyzing luminance values of the image data; and determine a first grayscale input luminance value, a second grayscale input luminance value, a third grayscale input luminance value, a first grayscale output luminance value, a second grayscale output luminance value and a third grayscale output luminance value corresponding to the post-processing function based on the first grayscale average luminance value, the second grayscale luminance value and the third grayscale average luminance value of the image data.

3. The system of claim 2, wherein:

the first logic is configured to calculate an average luminance value of the luminance values of the image data, when the average luminance value is lower than a first reference average luminance value, the first logic is configured to determine:
- the first grayscale average luminance value by calculating an average value of the luminance values lower than a first reference middle luminance value,
- the second grayscale luminance value as the first reference middle luminance value, and
- the third grayscale average luminance value by calculating an average value of the luminance values higher than the first reference middle luminance value, and when the average luminance value is higher than or equal to the first reference average luminance value and is lower than a second reference average luminance value, the first logic is configured to determine:
- the first grayscale average luminance value by calculating an average value of the luminance values lower than a second reference middle luminance value,
- the second grayscale luminance value as the second reference middle luminance value, and
- the third grayscale average luminance value by calculating an average value of the luminance values higher than the second reference middle luminance value, and when the average luminance value is higher than or equal to the second reference average luminance value, the first logic is configured to determine:
- the first grayscale average luminance value by calculating an average value of the luminance values lower than a third reference middle luminance value,
- the second grayscale luminance value as the third reference middle luminance value, and
- the third grayscale average luminance value by calculating an average value of the luminance values higher than the third reference middle luminance value.

4. The system of claim 3, wherein the first logic is configured to determine:

the first grayscale input luminance value using equation: IN_LOW=Y_MID/2;

the second grayscale input luminance value using equation: IN_MID=Y_MID;

the third grayscale input luminance value using equation: IN_HIGH=Y_MID+(Y_MAX−Y_MID)/2;

the first grayscale output luminance value using equation: OUT_LOW=IN_LOW−|(Y_LOW−IN_LOW)|;

the second grayscale output luminance value using equation: OUT_MID=IN_MID; and the third grayscale output luminance value using equation: OUT_HIGH=IN_HIGH+|(Y_HIGH−IN_HIGH)|, where IN_LOW represents the first grayscale input luminance value, IN_MID represents the second grayscale input luminance value, IN_HIGH represents the third grayscale input luminance value, Y_LOW represents the first grayscale average luminance value, Y_MID represents the second grayscale luminance value, Y_HIGH represents the third grayscale average luminance value, Y_MAX represents a maximum luminance value, OUT_LOW represents the first grayscale output luminance value, OUT_MID represents the second grayscale output luminance value, and OUT_HIGH represents the third grayscale output luminance value.

5. The system of claim 4, wherein the first logic is configured to:

apply a gain coefficient to a difference between the first grayscale input luminance value and the first grayscale output luminance value to determine the first grayscale output luminance value having an increased difference with respect to the first grayscale input luminance value; and apply the gain coefficient to a difference between the third grayscale input luminance value and the third grayscale output luminance value to determine the third grayscale output luminance value having an increased difference with respect to the third grayscale input luminance value.

6. The system of claim 1, wherein the backward select signal is to have:

a first value indicating that the HDR forward process is to be performed when a frame rate of the display device is higher than or equal to a reference frame rate, and a second value indicating that the HDR backward process is to be performed when the frame rate of the display device is lower than the reference frame rate.

7. The system of claim 1, wherein the backward select signal is to have:

a first value indicating that the HDR forward process is to be performed when a movement amount of an object represented by the image data is less than a reference movement amount, and a second value indicating that the HDR backward process is to be performed when the movement amount of the object represented by the image data is greater than or equal to the reference movement amount.

8. The system of claim 1, wherein the backward select signal is to have:

a first value indicating that the HDR forward process is to be performed when an average luminance value of the image data is lower than a reference luminance value, and a second value indicating that the HDR backward process is to be performed when the average luminance value of the image data is higher than or equal to than the reference luminance value.

9. The system of claim 1, wherein the processor is configured to:

receive a first grayscale input luminance value, a second grayscale input luminance value, a third grayscale input luminance value, a first grayscale output luminance value, a second grayscale output luminance value and a third grayscale output luminance value corresponding to the post-processing function;

determine a conversion difference value corresponding to the post-processing function with respect to each luminance value of the image data using the first grayscale input luminance value, the second grayscale input luminance value, the third grayscale input luminance value, the first grayscale output luminance value, the second grayscale output luminance value, and the third grayscale output luminance value;

calculate an output luminance value corresponding to the luminance value of the image data by adding the conversion difference value to the luminance value of the image data in a case where the backward select signal has a first value; and calculate the output luminance value corresponding to the luminance value of the image data by subtracting the conversion difference value from the luminance value of the image data in a case where the backward select signal has a second value.

10. The system of claim 9, wherein:

when the luminance value of the image data is lower than the second grayscale input luminance value, the processor is configured to determine the conversion difference value for the luminance value using equation: CONV_DIFF=2*(OUT_LOW−IN_LOW)*Y_IN/IN_LOW−(OUT_LOW−IN_LOW)*(Y_IN)$^2$/(IN_LOW)$^2$, where CONV_DIFF represents the conversion difference value, OUT_LOW represents the first grayscale output luminance value, IN_LOW represents the first grayscale input luminance value, and Y_IN represents the luminance value of the image data, when the luminance value of the image data is higher than the second grayscale input luminance value, the processor is configured to determine the conversion difference value for the luminance value using equation: CONV_DIFF=2*(OUT_HIGH−IN_HIGH)*(Y_IN−IN_MID)/(IN_HIGH−IN_MID)−(OUT_HIGH−IN_HIGH)*(Y_IN−IN_MID)$^2$/(IN_HIGH−IN_MID)$^2$, where CONV_DIFF represents the conversion difference value, OUT_HIGH represents the third grayscale output luminance value, IN_HIGH represents the third grayscale input luminance value, Y_IN represents the luminance value of the image data, and IN_MID represents the second grayscale input luminance value, when the backward select signal has the first value, the processor is configured to calculate the output luminance value corresponding to the luminance value using equation: Y_OUT=Y_IN+CONV_DIFF, where Y_OUT represents the output luminance value, Y_IN represents the luminance value of the image data, and CONV_DIFF represents the conversion difference value, and when the backward select signal has the second value, the processor is configured to calculate the output luminance value corresponding to the luminance value using equation: Y_OUT=Y_IN−CONV_DIFF, where Y_OUT represents the output luminance value, Y_IN represents the luminance value of the image data, and CONV_DIFF represents the conversion difference value.

11. The system of claim 1, further comprising:
a first converter configured to perform an RGB-to-YCbCr conversion operation on the image data to generate YCbCr data including luminance data and chrominance data; and
a second converter configured to perform a YCbCr-to-RGB conversion operation on output image data output from the processor to generate RGB data.

12. The system of claim 1, further comprising:
second logic between the first logic and the processor,
wherein the second logic is configured to receive input and output luminance values corresponding to the post-processing function from the first logic and to selectively provide the input and output luminance values or user setting input and output luminance values to the processor in response to a user setting signal.

13. The system of claim 12, wherein the second logic includes:
a storage block configured to store the user setting input and output luminance values; and
a multiplexer configured to receive the input and output luminance values corresponding to the post-processing function from the first logic, receive the user setting input and output luminance values from the storage block, and to selectively output the input and output luminance values or the user setting input and output luminance values to the processor in response to the user setting signal.

14. A system, comprising:
first logic configured to analyze image data to determine a first post-processing function corresponding to a high dynamic range (HDR) forward process;
second logic configured to receive a backward select signal and select the first post-processing function or a second post-processing function corresponding to a HDR backward process in response to the backward select signal; and
a processor configured to perform:
the HDR forward process corresponding to the first post-processing function on the image data when the first post-processing function is selected, and
the HDR backward process corresponding to the second post-processing function on the image data when the second post-processing function is selected,
wherein the HDR forward process includes decreasing low grayscale or low luminance values and increase high grayscale or high luminance values in the image data.

15. The system of claim 14, wherein the second logic includes:
a storage block configured to store second input and output luminance values corresponding to the second post-processing function; and
a multiplexer configured to receive first input and output luminance values corresponding to the first post-processing function from the first logic, receive the second input and output luminance values from the backward function storage block, and selectively output the first input and output luminance values or the second input and output luminance values to the HDR processor in response to the backward select signal.

16. A display device, comprising:
a display panel including a plurality of pixels;
a data driver configured to provide data signals to the plurality of pixels;
a scan driver configured to provide scan signals to the plurality of pixels; and
a controller configured to control the data driver and the scan driver, the controller comprising:
logic configured to receive a backward select signal, analyze image data to determine a post-processing function, and selectively perform a high dynamic range (HDR) forward process or an HDR backward process on the image data in response to the backward select signal, where the HDR forward process correspond to the post-processing function and includes decreasing low grayscale or low luminance values and increase high grayscale or high luminance values in the image data, and wherein the HDR backward process corresponds to an inverted function of the post-processing function.

17. The display device of claim 16, wherein the controller comprises:
 a generator configured to detect a frame rate of the display device and to:
 generate the backward select signal having a first value indicating that the HDR forward process is to be performed when the frame rate is higher than or equal to a reference frame rate, and
 generate the backward select signal having a second value indicating that the HDR backward process is to be performed when the frame rate is lower than the reference frame rate.

18. The display device of claim 16, wherein the controller comprises:
 a generator configured to detect a movement amount of an object represented by the image data and to:
 generate the backward select signal having a first value indicating that the HDR forward process is to be performed when the movement amount of the object is less than a reference movement amount, and
 generate the backward select signal having a second value indicating that the HDR backward process is to be performed when the movement amount of the object is greater than or equal to the reference movement amount.

19. The display device of claim 16, wherein the controller comprises:
 a generator configured to calculate an average luminance value of the image data and to:
 generate the backward select signal having a first value indicating that the HDR forward process is to be performed when the average luminance value is lower than a reference luminance value, and
 generate the backward select signal having a second value indicating that the HDR backward process is to be performed when the average luminance value is higher than or equal to than the reference luminance value.

20. The display device of claim 16, wherein the controller comprises:
 a HDR device configured to perform a HDR process on the image data and to provide the image data on which the HDR process is performed to the logic.

* * * * *